US011461985B2

(12) United States Patent
Cini

(10) Patent No.: US 11,461,985 B2
(45) Date of Patent: Oct. 4, 2022

(54) METHODS AND SYSTEMS FOR RENDERING AND MODIFYING THREE-DIMENSIONAL MODELS FOR INTERIOR DESIGN

(71) Applicant: Lisa Cini, Columbus, OH (US)

(72) Inventor: Lisa Cini, Columbus, OH (US)

(73) Assignee: MOSAIC, LTD, Columbus, OH (US)

( * ) Notice: Subject to any disclaimer, the term of this patent is extended or adjusted under 35 U.S.C. 154(b) by 0 days.

(21) Appl. No.: 16/745,654

(22) Filed: Jan. 17, 2020

(65) Prior Publication Data

US 2020/0242849 A1     Jul. 30, 2020

Related U.S. Application Data

(60) Provisional application No. 62/798,683, filed on Jan. 30, 2019.

(51) Int. Cl.
*G06T 15/00* (2011.01)
*G06T 19/20* (2011.01)
(Continued)

(52) U.S. Cl.
CPC ............... *G06T 19/20* (2013.01); *G06T 7/73* (2017.01); *G06T 17/00* (2013.01);
(Continued)

(58) Field of Classification Search
CPC ......... G06T 19/00; G06T 17/20; G06T 17/00; G06T 15/10; G06T 15/00; G06T 17/05;
(Continued)

(56) References Cited

U.S. PATENT DOCUMENTS 6,572,377 B2 * 6/2003 Masters ................. G09B 25/04
434/72
7,277,572 B2  10/2007 MacInnes et al.
(Continued)

FOREIGN PATENT DOCUMENTS

CN          102663830         9/2012
CN          107944124         4/2018

OTHER PUBLICATIONS

Saw SH, Tan HW, Safdar S, Tan TB. A simple interactive 3D interior design application for living room. In International Conference on Frontiers of Communications, Networks and Applications (ICFCNA 2014—Malaysia).*
(Continued)

*Primary Examiner* — Phu K Nguyen
(74) *Attorney, Agent, or Firm* — Caldwell Intellectual Property Law, LLC

(57) ABSTRACT

A system for rendering and modifying three-dimensional models for interior design includes a modeling device configured to receive a current design of an interior space, generate a data structure representing the interior space, by populating a plurality of attributes of the data structure and generating a first three-dimensional model of a first portion of the interior space based on the current design, wherein the first three-dimensional model includes a first feature having a first attribute of the plurality of attributes, and wherein a second attribute of the plurality of the attributes is exterior to the first three-dimensional model, display the first three-dimensional model to a user, receive at least a command to modify the first attribute, modify the first three-dimensional model as a function of the at least a command to modify the first attribute, and modify the second attribute as a function of the modification to the first attribute.

18 Claims, 8 Drawing Sheets

(51) Int. Cl.
*G06T 7/73* (2017.01)
*G06T 17/00* (2006.01)

(52) U.S. Cl.
CPC .. *G06T 2200/08* (2013.01); *G06T 2219/2012* (2013.01); *G06T 2219/2016* (2013.01); *G06T 2219/2024* (2013.01)

(58) Field of Classification Search
CPC ....... G06T 7/543; G06T 19/006; G06T 19/20; G06T 2200/24; G06T 2210/04; G06T 2219/2004; G06T 2219/2012; G06T 2219/2024; G06F 17/5004; G06K 9/00
USPC ......................................................... 345/418
See application file for complete search history.

(56) References Cited

U.S. PATENT DOCUMENTS

| | | | | |
|---|---|---|---|---|
| 7,523,411 B2* | 4/2009 | Carlin | .................... | G06Q 30/02 345/419 |
| 7,661,959 B2* | 2/2010 | Green | .................... | G06Q 99/00 434/75 |
| 8,411,085 B2* | 4/2013 | Rubin | .................... | G06T 19/00 345/419 |
| 8,540,153 B2* | 9/2013 | Stone | .................... | G06Q 50/165 235/383 |
| 9,019,266 B2* | 4/2015 | Hoguet | .................. | G06Q 10/06 345/419 |
| 9,355,470 B2* | 5/2016 | Merrell | .................... | G06T 19/00 |
| 9,817,922 B2 | 11/2017 | Glunz et al. | | |
| 9,959,675 B2* | 5/2018 | Gal | ........................ | G06T 19/006 |
| 9,972,173 B2* | 5/2018 | Nozaki | .................... | G06F 1/16 |
| 10,002,208 B2* | 6/2018 | Jovanovic | .............. | G06F 30/00 |
| 10,049,297 B1* | 8/2018 | Chen | .................... | G06K 9/00691 |
| 10,504,297 B2* | 12/2019 | Cuthbertson | .......... | G06Q 10/06 |
| 10,580,207 B2* | 3/2020 | Pejic | ........................ | G06T 7/543 |
| 2006/0195792 A1* | 8/2006 | Burnett | .................. | G06Q 30/06 715/745 |
| 2008/0154553 A1* | 6/2008 | Friedman | ................ | G06F 30/13 703/1 |
| 2010/0161288 A1 | 6/2010 | Thomas | | |
| 2013/0073420 A1 | 3/2013 | Kumm et al. | | |
| 2013/0222393 A1* | 8/2013 | Merrell | .................... | G06T 11/00 345/441 |
| 2014/0358617 A1* | 12/2014 | Lepage | ............ | G06Q 10/06313 705/7.23 |
| 2014/0368378 A1* | 12/2014 | Crain | ........................ | G01S 7/026 342/25 A |
| 2016/0048497 A1* | 2/2016 | Goswami | .............. | G06F 40/143 715/234 |
| 2016/0070826 A1 | 3/2016 | Yao et al. | | |
| 2016/0343140 A1* | 11/2016 | Ciprari | .................... | G06T 17/20 |
| 2019/0205485 A1* | 7/2019 | Rejeb Sfar | .............. | G06F 30/13 |
| 2019/0362539 A1* | 11/2019 | Kurz | ......................... | G06T 7/73 |
| 2020/0111254 A1* | 4/2020 | Ciprari | .................... | G06T 17/05 |
| 2020/0134560 A1* | 4/2020 | McLinden | ......... | G06Q 10/0875 |
| 2020/0175576 A1* | 6/2020 | Born | .................... | G06Q 30/0643 |

OTHER PUBLICATIONS

Ogino A. A design support system for indoor design with originality suitable for interior style. In2017 International Conference on Biometrics and Kansei Engineering (ICBAKE) Sep. 15, 2017 (pp. 74-79). IEEE.*

Hui J. Approach to the Interior Design Using Augmented Reality Technology. In2015 Sixth International Conference on Intelligent Systems Design and Engineering Applications (ISDEA) Aug. 18, 2015 (pp. 163-166). IEEE.*

Kaji S, Kolivand H, Madani R, Salehinia M, Shafaie M. Augmented reality in smart cities: applications and limitations. Journal of Engineering Technology. Jan. 2018;6(1):28-45.*

Redondo E, Fonseca D, Sánchez A, Navarro I. New strategies using handheld augmented reality and mobile learning-teaching methodologies, in architecture and building engineering degrees. Procedia Computer Science. Jan. 1, 2013;25:52-61.*

Vassigh S, Elias A, Ortega FR, Davis D, Gallardo G, Alhaffar H, Borges L, Bernal J, Rishe ND. Integrating Building Information Modeling with Augmented Reality for Interdisciplinary Learning. In2016 IEEE International Symposium on Mixed and Augmented Reality (ISMAR—Adjunct) Sep. 19, 2016 (pp. 260-261). IEEE.*

Feizbakhsh, Alex. "Augmented Reality Applied to Tenant Improvement Projects." (2018).*

TheSketchUpEssentials, Real Time Cost Estimating with Estimator for SketchUp—SketchUp Extension of the Week #32, Jul. 6, 2017, https://www.youtube.com/watch?v=yjYYNoJXqew.*

Autodesk, Jan. 14, 2019 https://webcache.googleusercontent.com/search?q=cache:0N5ITNpEa1EJ:https://www.cadlinecommunity.co.uk/hc/enus/article_attachments/200579112/Revit_BIM_for_Interior_Design.pdf+&cd=10&hl=en&ct=clnk&gl=US.

Pcon-Planner, Jan. 14, 2019 https://pcon-planner.com/en/3d-room-planner/.

Chief Architect, Chief Architect Architectural Home Design Software, Jan. 14, 2019 https://www.chiefarchitect.com/interior-design-software/.

Nig Ke Zhu, Using BIM Technology to Optimize the Traditional Interior Design Work Mode, Sep. 2018 https://www.e3s-conferences.org/articles/e3sconf/pdf/2018/13/e3sconf_icemee2018_03026.pdf.

Ecdesign, Jan. 14, 2019 https://www.ecdesign.se/ecdesign.html.

* cited by examiner

METHODS AND SYSTEMS FOR RENDERING AND MODIFYING THREE-DIMENSIONAL MODELS FOR INTERIOR DESIGN

CROSS-REFERENCE TO RELATED APPLICATIONS

This application claims the benefit of priority of U.S. Provisional Patent Application Ser. No. 62/798,683, filed on Jan. 30, 2019, and titled "METHODS AND SYSTEMS FOR RENDERING AND MODIFYING THREE-DIMENSIONAL MODELS FOR INTERIOR DESIGN," which is incorporated by reference herein in its entirety.

FIELD OF THE INVENTION

The present invention generally relates to the field of computer graphical processing. In particular, the present invention is directed to systems and methods for rendering and modifying three-dimensional models for interior design.

BACKGROUND

Interior design projects require careful planning accounting for many different factors, including not only the appearance of the final design, but the way in which elements needed to effect the design interact, and the practical consequences thereof. Current modeling and graphical programs generally lack the sophistication to account for these factors; such modeling programs are also complicated to use. The result may be poorly executed or inoperative plans that must be continually rewritten, for construction and design projects that rapidly spiral out of control.

SUMMARY OF THE DISCLOSURE

In an aspect, a method of rendering and modifying three-dimensional models for interior design includes receiving a current design of an interior space in a building. The method includes generating a data structure representing the interior space, wherein generating the data structure further includes populating a plurality of attributes of the data structure and generating a first three-dimensional model of a first portion of the interior space based on the current design, wherein the first three-dimensional model includes a first feature having a first attribute of the plurality of attributes, wherein a second attribute of the plurality of attributes is exterior to the first three-dimensional model. The method includes displaying the first three-dimensional model to a user. The method includes receiving at least a command to modify the first attribute. The method includes modifying the first three-dimensional model as a function of the at least a command to modify the first attribute. The method includes modifying the second attribute as a function of the modification to the first attribute.

In another aspect, a system for rendering and modifying three-dimensional models for interior design includes a modeling device designed and configured to receive a current design of an interior space in a building, generate a data structure representing the interior space, wherein generating the data structure further includes populating a plurality of attributes of the data structure and generating a first three-dimensional model of a first portion of the interior space based on the current design, wherein the first three-dimensional model includes a first feature having a first attribute of the plurality of attributes, and wherein a second attribute of the plurality of attributes is exterior to the first three-dimensional model, display the first three-dimensional model to a user, receive at least a command to modify the first attribute, modify the first three-dimensional model as a function of the at least a command to modify the first attribute, and modify the second attribute as a function of the modification to the first attribute.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure provide a three-dimensional modeling system for designs of interior spaces such as rooms and corridors that permits operators to select, arrange, and modify features of the three-dimensional model to reflect potential changes to a corresponding real interior space accurately. Interdependencies may be detected and/or performed using machine learning processes such as k-means clustering algorithms, feature learning, and/or classifiers; processes may be represented and/or archived using a decision tree data structure. In an embodiment, not only may the appearances of introduced or modified features be portrayed accurately in situ, but effects of features on one another or on one or more goals of a project may also be represented accurately; this result may be enabled by introduction of data structures marrying three-dimensional models of spaces and features with data elements representing seen and unseen attributes of such features, as well as rules for interactions of such data elements between data structures that affect in turn rules for rendering a resulting three-dimensional model of a space and its contents.

Figure 1:
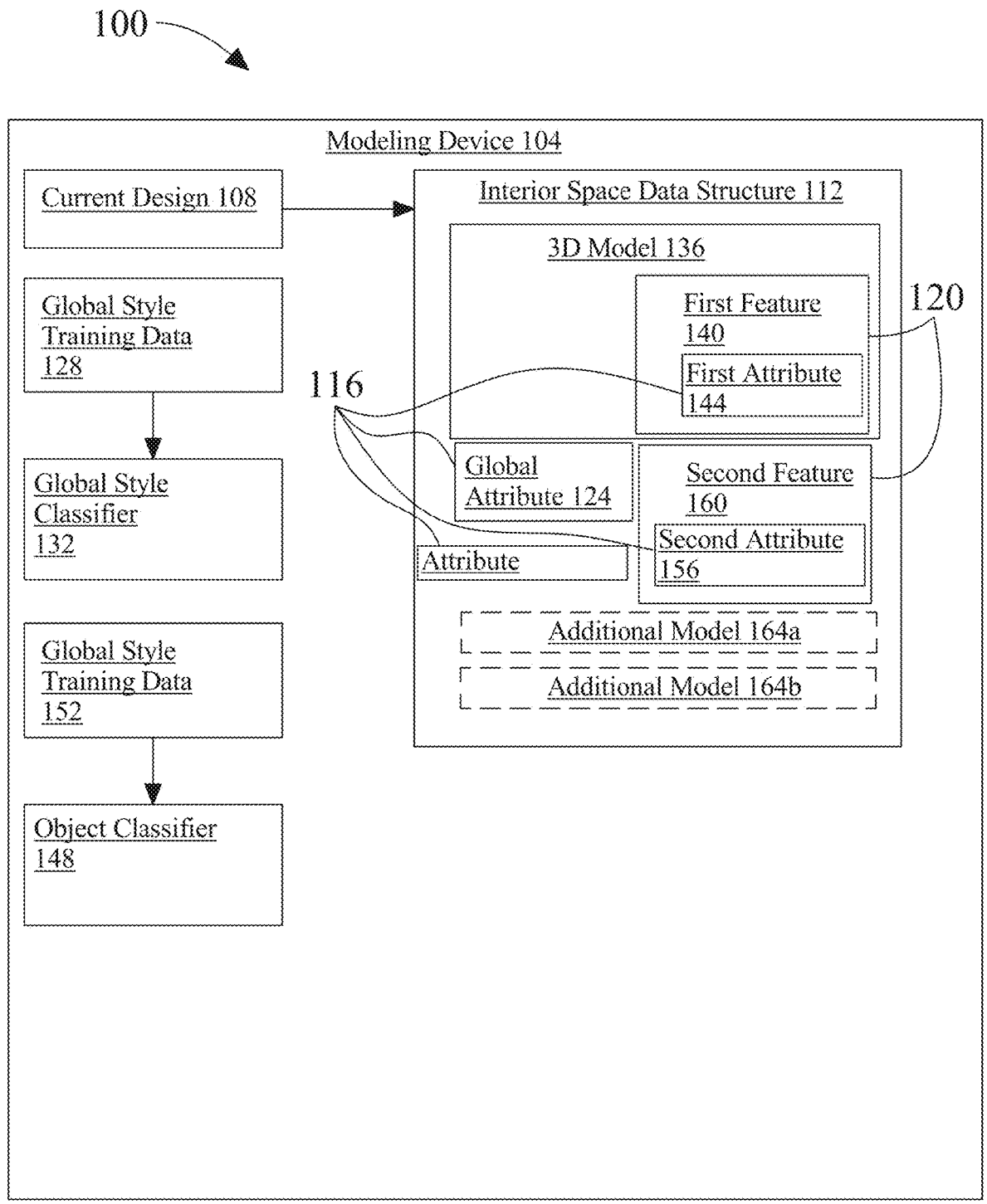
FIG. 1 is a block diagram illustrating an exemplary embodiment of a system as described herein.

Referring now to FIG. 1, an exemplary embodiment of a system 100 for rendering and modifying three-dimensional models for interior design is illustrated. System 100 includes a modeling device 104. Modeling device 104 may include any computing device as described in this disclosure. Modeling device 104 may include, without limitation, a server, a desktop computer, a handheld device or mobile device such as a smartphone or tablet, and/or a special purpose device incorporating, as a non-limiting example, a biometric reader as described in further detail below. Modeling device 104 may include two or more devices working in concert or in parallel; modeling device 104 may include, for instance, a first server or cluster of servers in a first location and a second server or cluster of servers in a second location. Modeling device 104 may include computing devices that are dedicated to particular tasks; for instance, a single computing device or cluster of computing devices may be dedicated to the operation of queues described below, while a separate computing device or cluster of computing devices may be dedicated to storage and/or production of dynamic data as described in further detail below. Modeling device 104 may include one or more computing devices dedicated to data storage, security, distribution of traffic for load balancing, and the like. Modeling device 104 may distribute one or more computing tasks as described below across a plurality of computing devices of modeling device 104, which may operate in parallel, in series, redundantly, or in any other manner used for distribution of tasks or memory between computing devices. Modeling device 104 may be implemented using a "shared nothing" architecture in which data is cached at the worker; in an embodiment, this may enable scalability of system 100 and/or modeling device 104. In an embodiment, modeling device 104 may communicate locally or over a network to one or more remote devices to perform one or more embodiments of processes and/or process steps as disclosed in further detail below.

Still referring to FIG. 1, modeling device 104 may be designed and/or configured to perform any method, method step, or sequence of method steps in any embodiment described in this disclosure, in any order and with any degree of repetition. For instance, modeling device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Modeling device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In an embodiment, and continuing to refer to FIG. 1, modeling device 104 may be configured to receive a current design 108 of an interior space in a building. A current design 108 as used herein, is a model of an interior space, building, one or more portions of building including without limitation a portion containing interior space, or the like. Current design 108 may be provided in any suitable form, including without limitation one or more two-dimensional designs such one or more blueprints, which may include without limitation architectural blueprints. Current design 108 may be provided as a three-dimensional graphical model of interior space, building, and/or a portion of building, such as without limitation a computer-assisted design (CAD) model or the like. Current design 108 may be provided as a building information model (BIM). In an embodiment, modeling device 104 may be configured to convert one form of current design 108 to another.

Still referring to FIG. 1, current design 108 may be received from a remote device via a network connection including any wired, wireless or other network connection, and according to any suitable communication protocol over such a connection, as described for instance in reference to FIG. 8 below. Current design 108 may be received via local communication by direct connection to another device, a local or portable memory device, or the like. Receiving current design 108 may include converting current design 108 from a first form to a second. For instance, where current design 108 is received as a BIM, current design 108 may be converted to one or more alternative three-dimensional graphical forms such as without limitation one or more CAD models As a further example, one or more two-dimensional plans of building and/or portions thereof, such as without limitation architectural blueprints or the like, may be received and converted into three-dimensional forms using, for instance, additional data such as ceiling height or the like.

Continuing to refer to FIG. 1, in an embodiment, current design 108 may be generated on modeling device 104 using computer modeling software such as without limitation CAD software. A user may, for instance, enter one or more commands combining geometric elements to generate current design 108. Any combination of the above methods may be used; for instance, a two-dimensional plan may be received from a remote device, converted automatically to a three-dimensional form, and then edited via user commands to produce current design 108. Persons skilled in the art, upon reviewing the entirety of this disclosure, will be aware of various ways in which current design 108 may be received consistently with this disclosure.

Figure 2:
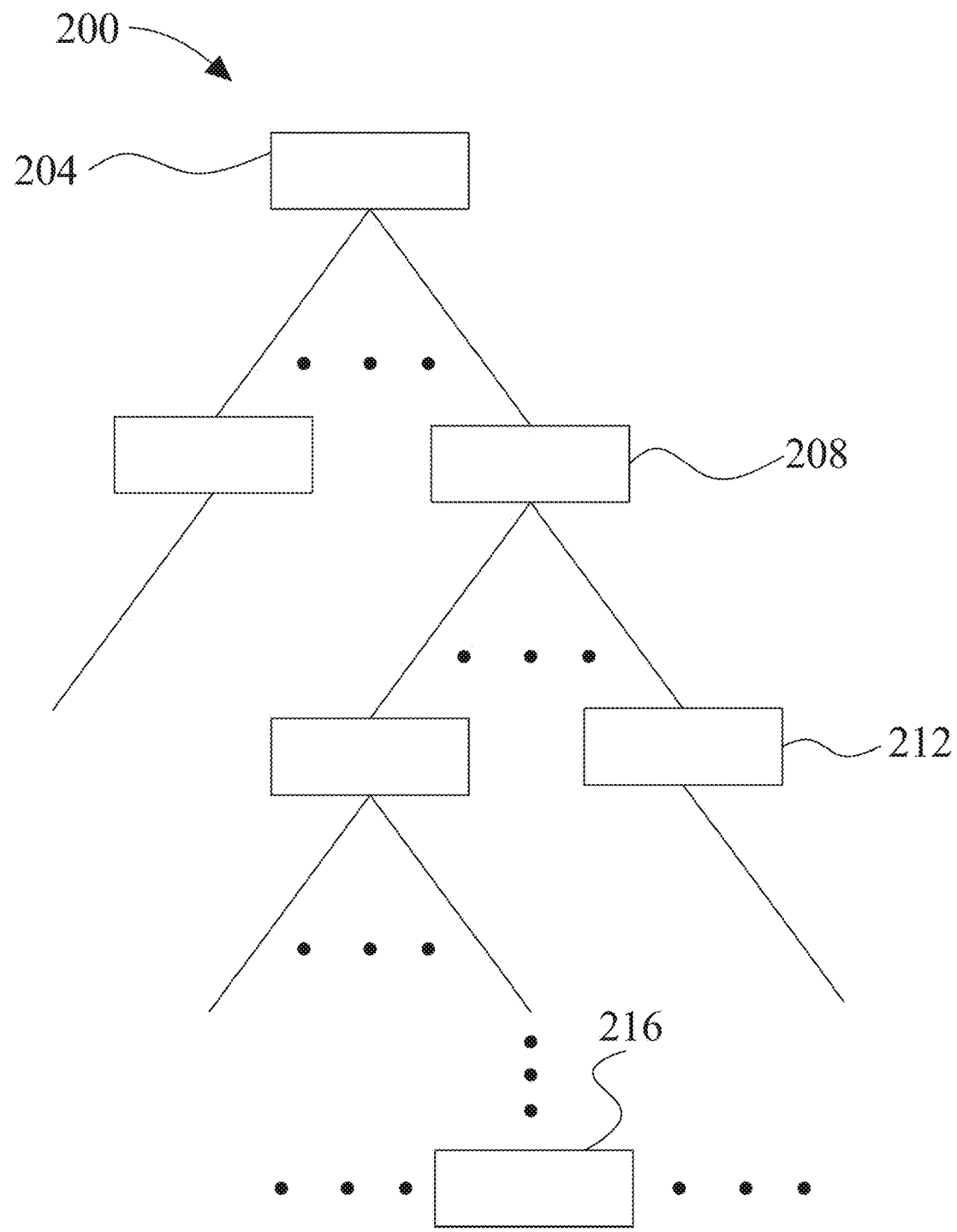
FIG. 2 is a block diagram illustrating an exemplary embodiment of a design decision tree 200.

Referring now to FIG. 2, generation of current design 108 and/or a part thereof may be performed by receiving data describing current design 108 and/or a in which current design is to be implemented and applying such received data to a design decision tree 200. Design decision tree 200 may include a set of nodes representing a current point in a decision tree traversal process and indicating possible subsequent nodes. Modeling device 104 may commence traversal of decision tree at a first node 204 and/or root node 204 representing an initial selection regarding current design 108 and/or a building and/or space in which current design 108 is implemented; modeling device may determine initial selection based upon any data received as described above and/or entered by a user. Selections to be made, and/or questions to be answered for traversal of decision tree may begin at more general questions toward a root of the decision tree and become more specific as the tree is traversed toward terminal and/or leaf nodes. For instance, and without limitation, a root node 204 may represent a selection of an overall building category and/or use, presenting a selection between residential, industrial, commercial, educational, or other categories; such initial categories may alternatively or additionally be made according to footprint, size height, or other criteria, which may alternatively or additionally be a subsequent node.

Still referring to FIG. 2, selection made at a root node 204 may be a selection of a second node 208, representing a set of decisions to be made based on the selection made at the root node 204. For instance, selection of a commercial building and/or space may lead to a second node 208 representing such a selection, and having paths to a plurality of potential third node 212s that represent categories of commercial buildings and/or spaces. Similarly a second node 208 representing a residential buildings and/or spaces may present potential selections of a third node 212 representing one of various categories of residential space, such as single-family homes, apartment buildings, condominium complexes, senior living facilities, college dorms, or the like. This may in turn lead to subsequent selections of nodes representing additional categories, of which there may be any number of tiers of node selections prior to arrival at a terminal node and/or leaf node. Selections made at each node may be recorded in any suitable data structure, including without limitation a tree, array, vector, and/or one or more database entries. Each selection may specify one or more architectural, structural, engineering, and/or stylistic choices, which may in turn dictate attributes of current design 108, an interior space data structure as described in further detail below, one or more of plurality of features as described in further detail below, or the like. Decision tree may act as a super-structure uniting various interior space data structures as described below, which may represent, for instance, a variety of interior spaces to be modeled and/or built in an overall project. Thus, a user and/or automated process as described in further detail below may use a decision tree to coordinate decisions made between various project levels, permitting both customized and/or personalized choices to be made at each interior space while checking for consistency between such choices; for instance, where a user and/or process modifies a global attribute such as a global style attribute of one interior space as described in further detail below, modeling device 104 may compare this choice to at least a selection in an existing design decision tree 200, determine that the modified global attribute is inconsistent with the at least a selection, and generate a prompt permitting a user to modify the global attribute to be consistent with the at least a selection, to modify the at least a selection to be consistent with the global attribute, and/or to ignore the inconsistency. Modeling device may save a history of selections, which may be useable to reverse decision tree modifications to earlier version and/or to render previous versions by generating interior space data structures and/or three-dimensional models representing previous versions for comparison and/or replacement of current designs; in an embodiment, every element and/or attribute of an interior space data structure and/or current design 108 may be represented by decisions in decision tree, such that decision tree and/or version history thereof may be useable to explore, render, and/or modify any or all previous decisions, giving a user the ability to undo and/or redo past decisions.

As a further illustrative example, and continuing to refer to FIG. 2, if a third node 212 is selected representing a senior living facility, subsequent nodes may include, in any suitable order, a node representing a selection of resident mix, such as proportions of residents having certain age ranges or other demographic attributes, a node representing a selection of a minimum and/or maximum number of residents, a node representing a selection of a minimum number of rooms, a node representing a selection of a number of stories in a building, a node representing a selection of a building type such as I1, I2, or the like, a node representing a site type such as without limitation one or more preloaded and/or stored site types, and or one or more nodes representing selections concerning various internal considerations, such as without limitation selections of types and/or configuration of HVAC, selection of in-house or external laundry, selection of ceiling heights, selection of corridor widths, selection of trash locations and/or processing choices, selection of food service, such as restaurant style versus scheduled mass meals, selection of bathing services and/or facilities, selection of technology such as Internet access, wi-fi, television services, alert services, or the like, selection of medical service types and/or capabilities, and/or selection of systems for provision and/or reception of electric power, including without limitation backup generators. Persons skilled in the art, upon reviewing the entirety of this disclosure, will be aware of various alternative or additional nodes and/or selections represented therein, which may be included in design decision tree 200 to reflect choices generated an/or received regarding various aspects, attributes, and/or data structure representations of interior spaces and/or elements therein as described in further detail below. Each selection in design decision tree 200 may be made and/or modified by user command, comparison of selection criteria represented in a given node to data describing current design 108, an interior space data structure, or any other system 100 element described in this disclosure, and/or any combination thereof.

Referring again to FIG. 1, current design 108 may be generated by loading a stored current design representing a mock plan, where a "mock plan" is a set of data useable in a current design that does not represent an existing current design, and/or previously used design, which may include a design previously used by a current user and/or institution associated with current user, modeling device 104, and/or a client device connected thereto, and/or a design previously used in a location, building, and/or internal space having one or more characteristics in common with a location, building, and/or internal space in which current design 108 is currently implemented and/or is to be implemented. Alternatively or additionally, elements of current design 108 not received from user and/or other sources described herein may be populated by default using mock plan data and/or data from previously used designs and/or design decision tree 200s; such data may be replaced by a user and/or any process described herein. In some embodiments, a site plan and/or details or elements of a site plan may be imported to modeling device 104 and used to initialize and/or generate current design 108. A partial or complete version of a current design 108, for instance with modifications as described in this disclosure, may be generated and/or exported for provision to one or more professionals and/or entities responsible for one or more roles in construction, installation, and/or other implementation of a design and/or one or more components thereof; thus, for instance, an electrician may be provided with information describing electrical fixtures, outlets, and/or wiring to be installed and/or modified, without receiving other details not pertinent to such work. Similarly, a construction crew and/or company may receive footprint and other data describing and/or pertaining to construction and/or remodeling of a building to be performed in implementation of a design.

Further referring to FIG. 1, and as a non-limiting, illustrative example, parameters and/or elements of current design 108, design decision tree 200, and/or modifications thereto may include, without limitation, building Layouts and/or elements thereof such as type, capacity, exterior backdrops, site plan backdrops (site test fit, restrictions); plans representing room types, sizes, door arrangements, window types, HVAC options, bathroom placement, layout orientation, and/or finishes; hall variations such as corridor width, corridor height, door set-backs versus straight, traffic flow, common area placement, finishes, walls, doors, trim, floors, lighting and ceiling treatments, or the like; common plan elements such as types, height, width, volume, capacity, available space/proportions, finishes, walls, doors, trim, floors, lighting and/or ceiling treatments, or the like; back-of-house area plans including types, height, width, volume, capacity, available space/proportions, finishes, walls, doors, trim, floors, lighting and/or ceiling treatments, or the like; ceiling design plans including ceiling type, trim, heights, soffits, fixtures such as lighting, HVAC, and/or finishes, or the like; and/or miscellaneous options such as lighting, specialty wall, commercial kitchen, treatments, plumbing fixtures, elevators, spa tubs, HVAC types, courtyards, life skills, and/or set pieces of "white" furniture such as for living rooms, resident rooms, dining rooms, and/or activity rooms.

With continued reference to FIG. 1, modeling device 104 is configured to generate a data structure 112 representing the interior space. Data structure 112 may be instantiated using any suitable function, memory addressing, object class, database implementation, or any other implementation that may occur to a person skilled in the art upon reviewing the entirety of this disclosure, which may be used to instantiate any elements and/or capabilities of any embodiment of data structure 112.

Still viewing FIG. 1, data structure 112 includes a plurality of attributes 116. An "attribute" as used in this disclosure is an element of data that describes a physical attribute to be modeled by one or more data structures 112 or models as described herein. An attribute may be created or stored using any data type, data structure 112, and/or object as used in object-oriented programming; a memory location and/or variable for storage of an attribute is referred to in this disclosure as an "attribute variable."

With continued reference to FIG. 1, plurality of attributes 116 may include attributes associated with, and/or included in data representations of, one or more features 120. A "feature 120" as used in this disclosure is a visible element of an interior space, where "visible" signifies that at least a part of the feature 120 is visible in a three-dimensional model as described in further detail below. A feature 120 may include a geometric or graphical representation of an item incorporated in, installed in, and/or making up a part of interior space; a geometric or graphical representation may include a three-dimensional graphical representation. Item may include any surface, fixture, internal design or architectural element, floor covering, wall covering, item of furniture, door, window, wall, ceiling, electrical outlet or other element of electrical circuitry, items of art or sculpture, and/or any other element of internal design. Geometric or graphical representation may include one or more visual representations of item, including without limitation color, shape, size, texture, material composition, or the like. Geometric or graphical representation may include lighting attributes of item, which may include light and/or shadows cast on item by other objects and/or light sources in internal space, light emitted by item where item is a light fixture, or the like. Features 120 may be stored in a database or data structure 112 within modeling device 104; features 120 may be stored and/or flagged according to one or more categories permitting classification of features 120. One or more features 120 may be classified, for instance, by portions of an interior space where features 120 are placed, such as walls, floor, ceiling, or the like. One or more features 120 may be further classified by type, such as fixtures, outlets, switches, wallpaper, baseboards, molding, furniture, or the like. Classification may include one or more sub-categories; for instance, molding may have a subcategory pertaining to crown molding. Features 120 may be classified to one or more global attributes 124 as described in further detail below. Persons skilled in the art, upon reviewing the entirety of this disclosure, will be aware of various other categories and/or subcategories that may be used to organize one or more features 120.

Continuing to view FIG. 1, each feature 120 may include at least an attribute of plurality of attributes 116, where inclusion of an attribute in a feature 120, as used herein, indicates association of the attribute with the feature 120 in a data object and/or structure storing the feature 120. At least an attribute included in a feature 120 may describe one or more physical or stylistic attributes of a feature 120. For example, and without limitation, at least an attribute may include a style attribute, which may be a global attribute 124 as described in further detail below; for instance, a feature 120 representing a ceiling may have a style attribute indicating that the ceiling is a Venetian-style ceiling, and thus consistent with a global style attribute for a Venetian interior. Alternatively or additionally, style attribute may be a feature 120-specific style attribute, which may be mapped in a data structure 112 as described above to one or more global style attributes; as an example, style attribute for a ceiling may indicate that ceiling is recessed, which may be consistent both with Venetian global style and Victorian internal style. A feature 120 may have several style attributes; for instance, a recessed ceiling may have an additional style attribute indicating a style of carving or other decoration consistent with a Venetian ceiling (and/or mapped to a global style attribute corresponding to Venetian interior in a data structure 112) and not a Victorian ceiling (or not mapping to a Victorian global style attribute), with a result that modeling device 104 may determine that feature 120 does not match a global style attribute of a Victorian interior, but does match a global style attribute of a Venetian interior. Persons skilled in the art will be aware of various ways in which style attributes may be defined, linked to and/or inconsistent with global style attributes as described above.

With continued reference to FIG. 1, at least an attribute may include one or more additional physical attributes including without limitation one or more colors, textures, material composition, shapes, masses, reflective and/or refractive properties, sizes in any dimension including without limitation length, height, width, thickness, and/or depth, or the like. At least an attribute may include a degree of strength, such as without limitation a maximum weight that may be borne by the item represented by the feature 120. At least an attribute may include a requirement such as an electrical wiring requirement of a light fixture, a plumbing requirement of a plumbing fixture, or the like; for instance, a given light fixture may require an electrical connection in a ceiling recess, which may require wiring to be laid to that recess, which may necessitate engaging an electrician. A feature 120 representing a first plumbing or electrical fixture that has been inserted in three-dimensional model and/or interior space data structure 112 containing the three-dimensional model may be inserted where plumbing and/or wiring is represented as laid in the model and/or interior space data structure 112; such wiring or plumbing may also be represented by a feature 120.

Still referring to FIG. 1, plurality of attributes 116 may include one or more global attributes 124, where a "global" attribute signifies, for the purposes of this disclosure, an attribute that has the same value for all elements of data structure 112, including all features 120 and/or attributes, that are associated with and/or that contain the global attribute 124. Plurality of attributes 116 may include a global style attribute. A global style attribute, as used in this disclosure, is an attribute indicating an architectural or interior design style according to which interior space is to be decorated, constructed, arranged, or otherwise instantiated. Global style attribute may be mapped to corresponding color, size or other attributes of features 120 as described below in one or more data structures 112 which may include without limitation one or more database tables linking one style attribute to another; global style attribute may be linked to a plurality of such attributes. As a non-limiting example, where global style attribute corresponds to a Venetian style of interior, the global style attribute may be linked to recessed ceilings in a Venetian style, such that modeling device 104 matches feature 120 data structures 112 corresponding to such ceilings; modeling device 104 may determine as a result, for instance, that a feature 120 representing a non-recessed ceiling does not match a global style attribute corresponding to a Venetian interior. Persons skilled in the art, upon reviewing the entirety of this disclosure, will be aware of multiple additional examples of global style attributes and matching feature 120 attributes that may be utilized consistently with this disclosure.

Continuing to refer to FIG. 1, attributes, which may include without limitation global attributes, may be selected according to and/or compared to one or more default settings and/or constraints, which may be set in modeling device 104, for instance according to laws and/or best practices such as the Americans with Disabilities Act and/or regulations pursuant thereto, local disability, health and/or safety regulations, industry standards, standards of one or more institutions and/or users involved in and/or overseeing construction and/or design, or the like. Such standards and/or default settings and/or constraints may include, without limitation, a requirement that corridors be a minimum of six feed wide, a requirement that all resident rooms have to have window to the outside, a requirement that corridors cannot be more than 20 feet dead-end without an exit, a requirement that public restrooms must be ADA-compliant, a requirement that ceiling heights must be a minimum of eight feet tall, a requirement that corridor door widths must be a minimum of 36 inches wide, 18 inches clear on pull side and/or 12 inches clear on push side, a requirement that resident room interior doors must be a min of 32 inches wide, a prohibition of pocket doors, a requirement specifying a maximum number and/or proportion of memory care residents in a given unit or set of units, a requirement that plumbing be back to back if possible, to save dollars on construction, or the like. Each and/or every one of these may be set during decision tree process, by user selection of attributes themselves and/or user selection of the requirements, and/or may be preset according to laws, regulations, and/or best practices by an administrator of system 100 or the like; it may be possible to override such default settings, and/or may be impossible, for instance, system 100 may not permit modifications to and/or versions of current design 108 that violate applicable laws and/or regulations.

With continued reference to FIG. 1, plurality of attributes 116 may include an infrastructural attribute. As used in this disclosure, an "infrastructural attribute" includes any attribute as defined herein of an interior space that is necessary to for a feature 120 to be installed in the interior space, aside from the feature 120 itself. For instance, and without limitation, an infrastructural attribute may include a structural attribute, defined as a structural feature 120 of a room necessary to support a weight or shape of a feature 120, including placement of studs or other supports within walls, presence of a particular expanse of space on a wall, ceiling, floor, or the like, a door frame or window frame capable of supporting a door or window of a particular weight, or the like. As another non-limiting example, an infrastructural attribute may include a supply attribute, which may be an attribute providing a supply of liquid, gas, or electricity to a feature 120; for instance, a feature 120 requiring electrical power, such as a light fixture, may be supported by a supply attribute that includes electrical wiring to the feature 120. As a further example, a feature 120 that burns natural gas, such as a furnace, gas fireplace, or the like, may be associated with a supply attribute that includes a gas pipeline or connection to the location of installation of the feature 120. In an additional non-limiting example, a feature 120 that uses water, such as a sink, fountain, or the like, may be associated with a supply attribute that connects the location of the feature 120 to plumbing supply and/or drain lines. A structural attribute may include a climatic attribute, which as used herein may include one or more modifications necessary to support and/or maintain living organisms, artwork, or the like, such as lighting and/or humidity requirements.

Still referring to FIG. 1, plurality of attributes 116 may include a lighting attribute, defined an attribute that affects ambient light in interior space. Lighting attribute may include isolated and/or aggregate effects items represented by features 120 have on lighting in internal space; such changes may include, without limitation, changes representing increased or decreased light output from light fixtures, decreased or increased light admitted by windows, addition of shades, frosted glass, or other elements that occlude or reduce light output or transmittance, increases or decreases in reflectiveness of item, increases or decreases in fluorescence or phosphorescence, increases or decreases in opacity or translucence, or the like. Lighting attribute may include a pattern of light and/or shadow cast on visual representation of features 120 and may be modified to reflect change; visual representation of second feature 160 may be changed accordingly as well. Lighting attributes such as light and shadow patterns in three-dimensional model may be tracked and represented as an attribute of three-dimensional model and/or of interior space data structure 112 containing the three-dimensional model Referring now to FIG. 3, an exemplary embodiment of a feature database 300 is illustrated. Feature database 300 may include any data structure 112 for ordered storage and retrieval of data, which may be implemented as a hardware or software module. Feature database 300 may be implemented, without limitation, as a relational database, a key-value retrieval datastore such as a NOSQL database, or any other format or structure for use as a datastore that a person skilled in the art would recognize as suitable upon review of the entirety of this disclosure. Feature database 300 may include a plurality of data entries and/or records corresponding to user tests as described above. Data entries in a feature database 300 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a feature database 300 may reflect categories, cohorts, and/or populations of data consistently with this disclosure.

Figure 3:
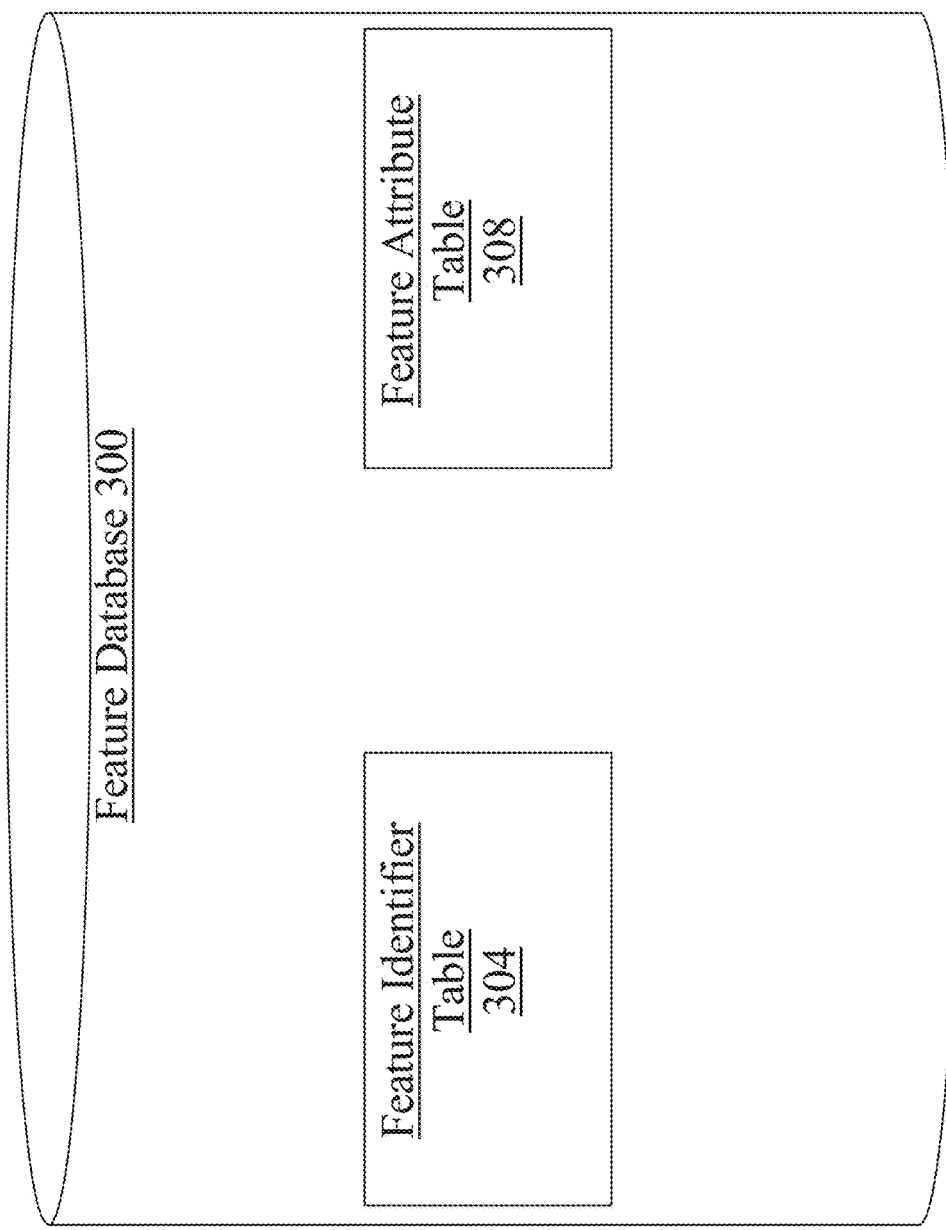
FIG. 3 is a block diagram illustrating an exemplary embodiment of a feature database.

Still referring to FIG. 3, feature database 300 may include one or more tables from which data records may be retrieved with linking data. As a non-limiting example, one or more tables may include a feature identifier table 304. Feature identifier table 304 may list unique identifiers of features 120, where "unique" may signify statistically unique, as with globally unique identifiers (GUID) and/or universally unique identifiers (UUID), and/or unique within system 100, as determined for instance by preventing creation of duplicate identifiers by verifying that a newly generated identifier is not already in use; this may be accomplished without limitation, by using a newly generated prospective identifier to query feature identifier table 304. Feature identifier table 304 may have additional columns associating a feature 120 with one or more data concerning the feature 120, such as without limitation a feature 120 description usable to describe a feature 120 verbally to a user, a feature 120 type, suitable for retrieval and/or comparison of multiple features 120 having aspects in common, and/or one or more feature 120 images, which may be used for visual selection of features 120 by users and/or display thereof in three-dimensional models as described in further detail below. Table 1, shown below, is provided for illustrative purposes only to indicate exemplary records, and/or elements thereof, which may be stored in feature identifier table 304 in an embodiment.

TABLE 1

| Feature Identifier | Feature Description | Feature Type |
| --- | --- | --- |
| 905281715 | Crystal chandelier | Light Fixture |
| 629648411 | Recessed Circular Florescent | Light Fixture |
| 215455165 | Persian Silk Rug | Floor covering |
| 106546549 | 3-inch shag white carpet | Floor covering |

Continuing to refer to FIG. 3, and as a non-limiting example, feature database 300 may include a feature attribute table 308. Feature attribute table 308 may include a column listing feature identifiers. Feature attribute table 308 may include a column listing identifiers of attributes that a feature 120 associated with a particular feature identifier possesses or is associated with, for instance as described above; each of such identifiers of attributes, which may be described as "attribute identifiers" for the purposes of this disclosure, may be unique, where uniqueness may have the meaning described above regarding feature identifiers. Feature attribute table 308 may, as a non-limiting example, include multiple rows for a given feature identifier, each row listing a different attribute identifier in an attribute identifier column; where a new attribute is associated with a feature 120 according to any method as described herein, a new row listing the feature identifier of the feature 120 and the attribute identifier may be added to feature attribute table 308. Feature attribute table 308 may have additional columns for storing data that may be written to and/or retrieved from feature attribute table 308 and/or feature database 300. Table 2, shown below, is provided for illustrative purposes only to indicate exemplary records, and/or elements thereof, which may be stored in feature attribute table 308 in an embodiment.

TABLE 2

| Feature Identifier | Attribute identifier |
| --- | --- |
| 905281715 | 55516116000 |
| 905281715 | 81818181118 |
| 905281715 | 98941153517 |

Figure 4:
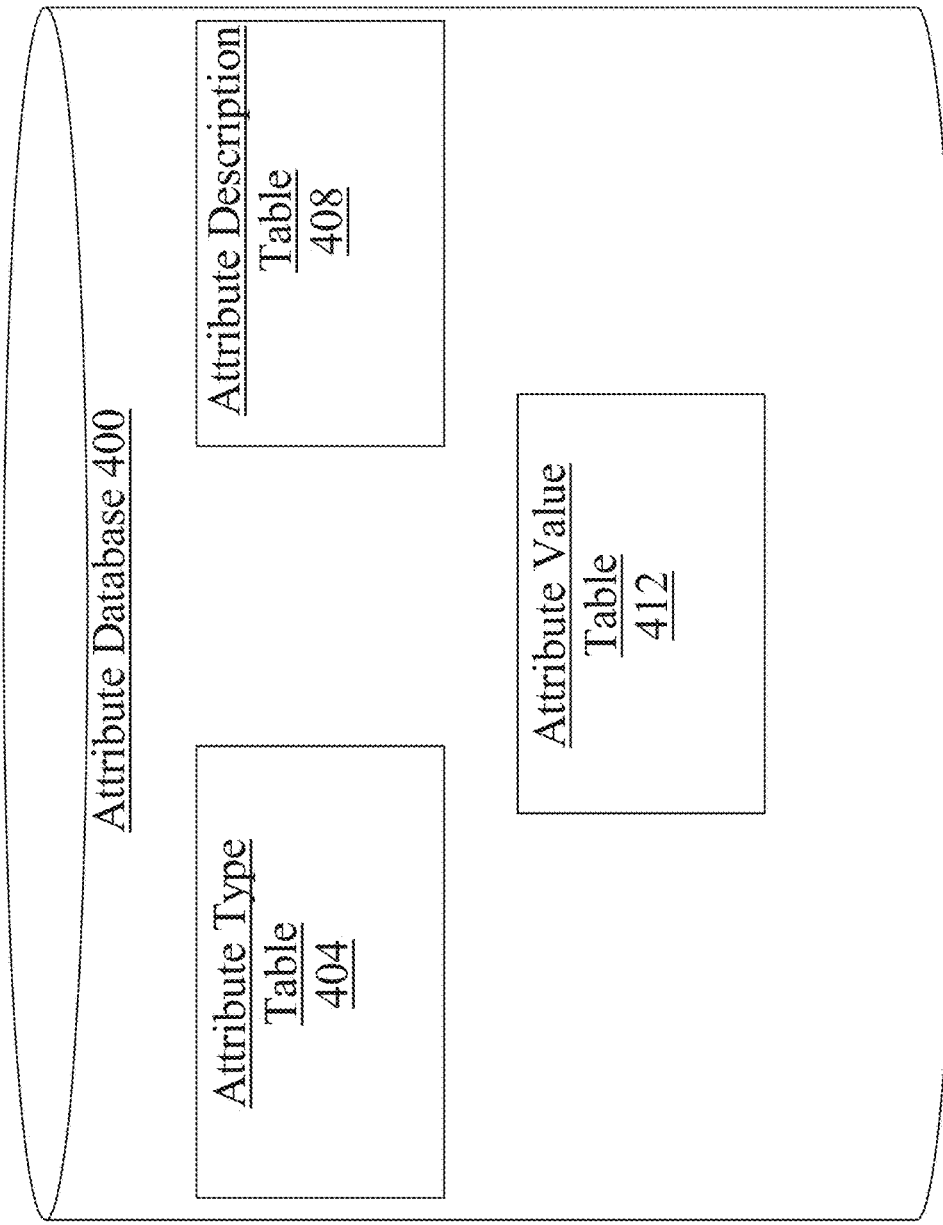
FIG. 4 is a block diagram illustrating an exemplary embodiment of an attribute database.

Referring now to FIG. 4, an exemplary embodiment of an attribute database 400 is illustrated. Attribute database 400 may have any form suitable for use as feature database 300 as described above. Attribute database 400 may include one or more tables such as, without limitation, an attribute type table 404, which may associate attribute identifiers with categories of attributes such as color, material, weight, function, shape, or the like, for instance as shown in Table 3, below.

TABLE 3

| Attribute identifier | Attribute Type |
| --- | --- |
| 55516116000 | Color |

Attribute database 400 may include, without limitation, an attribute description table 408, which may associate attribute identifiers with descriptions of attributes suitable for describing attributes to users. Attribute description table 408 may include one or more additional columns containing data as consistent with and/or in support of embodiments described below. An exemplary illustration of attribute description table 408 is shown for example in Table 4, below.

TABLE 4

| Attribute identifier | Attribute Description |
| --- | --- |
| 55516116000 | Color of a metal object such as a light fixture |

Attribute database 400 may include, without limitation, an attribute value table 412, which may associate attribute identifiers with values of attributes; for instance, a color attribute may have a red-green-blue color value and/or a string associated with a color, while a weight attribute may have an amount of weight or mass in pounds, kilograms or the like, a shape attribute may have a geometric value (e.g., rectangular, elliptical), and/or stylistic shape value (e.g., Ogee). Attribute value table 412 may include one or more additional columns containing data as consistent with and/or in support of embodiments described below. An exemplary illustration of attribute description table 408 is shown for example in Table 5, below.

TABLE 5

| Attribute identifier | Attribute Value |
| --- | --- |
| 55516116000 | Silver |

Figure 5:
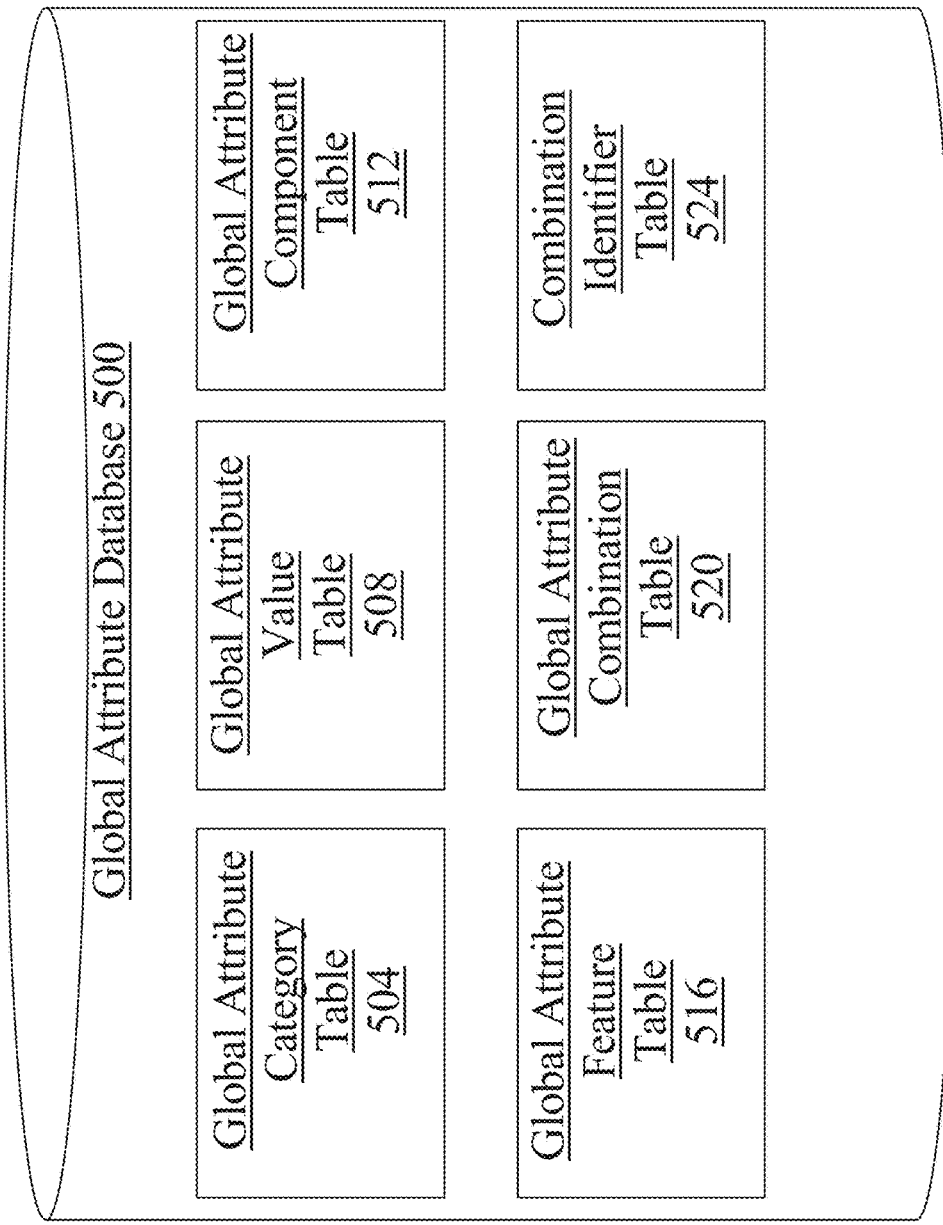
FIG. 5 is a block diagram illustrating an exemplary embodiment of a global attribute database.

Referring now to FIG. 5, an exemplary embodiment of a global attribute database 500 is illustrated. Global attribute database 500 may have any form suitable for use as feature database 300 as described above. Global attribute database 500 may include one or more tables such as, without limitation, a global attribute category table 504, which may associate attribute identifiers of global attributes 124 with categories of global attributes 124 such as a global style attribute, which may be denoted as having an attribute of "style," as shown in Table 6, below. Global attribute category table 504 may include one or more additional columns containing data as consistent with and/or in support of embodiments described below.

TABLE 6

| Global attribute identifier | Global attribute type |
| --- | --- |
| 71322148510 | Style |

Global attribute database 500 may include, without limitation, a global attribute value table 508, which may associate attribute identifiers of global attributes 124 with values, which may be labels containing any textual data that denote particular global attributes 124, such as "Venetian" as shown for example in Table 7, below. Global attribute category table 504 may include one or more additional columns containing data as consistent with and/or in support of embodiments described below.

TABLE 7

| Global attribute identifier | Global attribute value |
| --- | --- |
| 71322148510 | Venetian |

Global attribute database 500 may include, without limitation, a global attribute component table 512, which may associate attribute identifiers of global attributes 124 with other attributes that are associated with and/or classified to the global attribute 124, such as particular colors, room shapes, room proportions, or the like, as shown for example in Table 8, below. Global attribute component table 512 may include one or more additional columns containing data as consistent with and/or in support of embodiments described below.

TABLE 8

| Global attribute identifier | Attribute Identifier |
| --- | --- |
| 71322148510 | 55150611531 |
| 71322148510 | 81216813251 |
| 71322148510 | 20111715561 |
| 71322148510 | 64551355155 |

Global attribute database 500 may include, without limitation, a global attribute feature table 516, which may associate attribute identifiers of global attributes 124 with features 120 that are associated with and/or classified to the global attribute 124, such as particular ceiling types, fixtures, floor or wall coverings, or the like, as shown for example in Table 9, below. Global attribute feature table 516 may include one or more additional columns containing data as consistent with and/or in support of embodiments described below.

TABLE 9

| Global attribute identifier | Feature Identifier |
| --- | --- |
| 71322148510 | 905281715 |
| 71322148510 | 100544811 |

TABLE 9-continued

| Global attribute identifier | Feature Identifier |
| --- | --- |
| 71322148510 | 741811655 |
| 71322148510 | 315111800 |

Global attribute database 500 may include, without limitation, a global attribute combination table 520, which may associate attribute identifiers of global attributes 124 with identifiers of combinations of features 120 and/or attributes that are associated with and/or classified to the global attribute 124, as shown for example in Table 10, below. Global attribute combination table 520 may include one or more additional columns containing data as consistent with and/or in support of embodiments described below.

TABLE 10

| Global attribute identifier | Combination Identifier |
| --- | --- |
| 71322148510 | 9005115 |
| 71322148510 | 3362811 |
| 71322148510 | 1105549 |
| 71322148510 | 7767677 |

Global attribute database 500 may include, without limitation, a combination identifier table 524, which may associate attribute identifiers of combinations of features 120 and/or attributes identified in classifications or the like as described below with the features 120 and/or attributes identified as members of such combinations, as shown for example in Table 9, below. Combination identifier table 524 may include one or more additional columns containing data as consistent with and/or in support of embodiments described below.

TABLE 11

| Combination Identifier | Feature Identifier | Attribute Identifier |
| --- | --- | --- |
| 9005115 | 905281715 | 55150611531 |
| 3362811 | 100544811 | 81216813251 |
| 1105549 | 741811655 | 20111715561 |
| 7767677 | 315111800 | 64551355155 |

Referring again to FIG. 1, modeling device 104 may be configured to generate a global style attribute. In an embodiment, a user may select global style attribute, for instance by specifying that the user wishes the interior space in question to be rendered in a particular style. Global style attribute may alternatively or additionally be chosen as part of design decision tree 200 as described above. For instance, and without limitation, a graphical user interface may be provided to a user client device, which may be enabled to provide one or more options to user and/or receive one or more inputs from user as described in this disclosure; graphical user interface may be used to provide user with a list of global style attributes from which the user may select a global style attribute desired by the user, in which a user may perform keyword searches for particular global style attributes, or the like. Persons skilled in the art, upon reviewing the entirety of this disclosure, will be aware of various ways in which a user may be enabled to select and/or specify a global style attribute consistently with this disclosure, as well as the various input and output options that a graphical user interface may provide a user to do so.

Alternatively or additionally, and still referring to FIG. 1, modeling device 104 may be configured to generate a global style attribute automatically using one or more data provided to modeling device 104 concerning internal space, including without limitation one or more user inputs, current design 108, or the like, as set forth in further detail below. As a non-limiting example, one or more data provided to modeling device 104 may include one or more features 120 and/or sets of features 120 a user selects or has selected for display in a three-dimensional model and/or inclusion in data structure 112, a user selects or has selected for display in a three-dimensional model and/or inclusion in data structure 112, one or more features 120 and/or attributes described in current design 108, one or more features 120 or attributes of a distinct data structure 112 that a user identifies, for instance as generated in a previous iteration of an embodiment of a method as described in this disclosure, one or more features 120 and/or attributes identified in a photograph a user provides as described in more detail below, or the like. In an embodiment, one or more features 120 and/or sets of features 120, one or more attributes and/or sets of attributes, and/or any combination thereof, may be associated with a global style, for instance in global attribute component table 512 and/or global attribute feature table 516. Global attribute database 500 may, for instance, have additional tables and/or columns identifying combinations of features 120 and/or attributes that are associated with a particular global style; such combinations of features 120 and/or attributes may be identified in global attribute combination table 520, using combination identifier table 524, as described above. A feature 120, attribute, and/or any combination thereof as selected by and/or entered by user may be used to retrieve a matching global style attribute from global attribute 124 table. Global attribute 124 table may be populated, without limitation, by entries provided by users, who may be expert users selected by an administrator and/or proprietor of system 100; alternatively or additionally, global attribute 124 table may be populated by classification processes as described in further detail below.

With continued reference to FIG. 1, modeling device 104 may be configured to associate one or more classification algorithms. A classification algorithm, as used herein is a form of machine learning process. A machine learning process is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language. Training data, as used herein, is data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and continuing to refer to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by modeling device 104 may correlate any input data as described in this disclosure to any output data as described in this disclosure. As a non-limiting illustrative example, global style training data 128 may include sets of data correlating features 120, attributes, and global styles as identified in previous interior spaces, including without limitation spaces, features 120, and attributes identified by users such as expert users or the like, and/or spaces having identified or user-entered global styles for which image object classification has been performed as described in further detail below.

Still referring to FIG. 1, modeling device 104 may perform one or more classification algorithms, defined as processes whereby a computing device derives, from training data, a model known as a "classifier" for sorting inputs into categories or bins of data; modeling device 104 may, for instance, produce a global style classifier 132 that classifies features 120, attributes, and/or combinations of features 120 and/or attributes to one or more global styles most probably associated with such features 120, attributes, and/or combinations of features 120 and/or attributes. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

As a non-limiting and illustrative example, and still referring to FIG. 1, modeling device 104 may be configured to generate global style classifier 132 using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean, using, for instance global style training data 128 as described above. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of features 120, attributes, and/or combinations thereof to global style attributes, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, modeling device 104 may generate a k-means clustering algorithm receiving unclassified features 120, attributes, and/or combinations thereof as inputs and outputs a definite number of classified data entry cluster wherein the data entry clusters each contain cluster data entries associated with global style attributes and/or attribute identifiers thereof. K-means clustering algorithm may select a specific number of groups or clusters to output, identified by a variable "k." Generating a k-means clustering algorithm includes assigning inputs containing unclassified data to a "k-group" or "k-cluster" based on feature 120 similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of values which are utilized to classify data entry clusters containing cluster data entries. K-means clustering algorithm may act to classify a given global style attribute to one or more features 120, attributes, and/or combinations thereof, enabling modeling device 104 to identify features 120, attributes, and/or combinations thereof correlated with global style attributes.

Still referring to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids $c_i$ of centroids in set C. Unclassified data may be assigned to a cluster based on $argmin_{c_i} \ni_c dist(c_i, x)^2$, where argmin includes argument of the minimum, $c_i$ includes a collection of centroids in a set C, and dist includes standard Euclidean distance. K-means clustering algorithm may then recompute centroids by taking mean of all cluster data entries assigned to a centroid's cluster. This may be calculated based on $c_i = 1/|S_i| \Sigma x_i \ni S_i^{xi}$. K-means clustering algorithm may continue to repeat these calculations until a stopping criterion has been satisfied such as when cluster data entries do not change clusters, the sum of the distances have been minimized, and/or some maximum number of iterations has been reached.

Continuing to refer to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected set of features 120, attributes, and/or combinations thereof. Degree of similarity index value may indicate how close a particular combination of features 120, attributes, and/or combinations thereof to global style attributes is to being classified by k-means algorithm to a particular cluster. K-means clustering algorithm may evaluate the distances of features 120, attributes, and/or combinations thereof to global style attributes to the k-number of clusters output by k-means clustering algorithm. Short distances between features 120, attributes, and/or combinations thereof to global style attributes and a cluster may indicate a higher degree of similarity between a feature 120, attribute, and/or combination thereof to global style attributes and a particular cluster. Longer distances between features 120, attributes, and/or combinations thereof to global style attributes and a cluster may indicate a lower degree of similarity between the features 120, attributes, and/or combinations thereof to global style attributes and a particular cluster.

With continued reference to FIG. 1, k-means clustering algorithm may select a classified data entry cluster as a function of the degree of similarity index value. In an embodiment, k-means clustering algorithm may select a classified data entry cluster with the smallest degree of similarity index value indicating a high degree of similarity between a feature 120, attribute, and/or combination thereof and a particular data entry cluster representing a global style attribute. Alternatively or additionally k-means clustering algorithm may select a plurality of clusters having low degree of similarity index values to features 120, attributes, and/or combinations thereof, indicative of greater degrees of similarity. Degree of similarity index values may be compared to a threshold number indicating a minimal degree of relatedness suitable for inclusion of a feature 120, attribute, and/or combination thereof in a cluster, where degree of similarity indices falling under the threshold number may be included as indicative of high degrees of relatedness. The above-described illustration of learning using k-means clustering is included for illustrative purposes only, and should not be construed as limiting potential implementation of learning algorithms; persons skilled in the art, upon reviewing the entirety of this disclosure, will be aware of various additional or alternative learning approaches that may be used consistently with this disclosure.

Still referring to FIG. 1, modeling device 104 may be configured to generate global style classifier 132 using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(AB)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming global style training data 128 into a frequency table. Modeling device 104 may then calculate a likelihood table by calculating probabilities of different data entries and classification labels. Modeling device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

In an embodiment, and with continued reference to FIG. 1, modeling device 104 may identify a global style attribute for interior space using global style classifier 132 directly, and/or by querying global style database to find one or more data entries linking feature 120, attribute, and/or combination thereof to global style attributes. Modeling device 104 may populate global style database with an entry for each classification output having a probability of association above a threshold value; alternatively, where global style classifier 132 is configured to output a single classification, modeling device 104 may enter an entry in global style database associating a feature 120, attribute, and/or combination thereof with a single global style. The above processes may be combined; for instance, an initial and/or default global style may be identified using a database entry, and one or more suggested alternatives or options may be provided using global style classifier 132.

Still referring to FIG. 1, modeling device 104 may use global style classifier 132 and/or one or more data entries associated therewith to retrieve one or more features 120 and/or attributes associated with a current global style attribute of data structure 112. One or more features 120 and/or attributes may be populated in a graphical user interface as options for a user to select, for instance by providing a separate window and/or listing of "in style" features 120 and/or attributes, from which user may select a desired feature 120 and/or attribute, by listing "in style" features 120 and/or attributes first in an ordered listing of features 120 and/or attributes, or the like. Features 120 and/or attributes that are not associated with global style attribute may be visible and/or accessible to user as well. Graphical user interface may, for instance, display only features 120 and/or attributes associated with global style attribute when a setting visible to user so specifies, and user may be able to change the setting so that features 120 and/or attributes not associated with global style attribute may display. Where a given feature 120 and/or attribute is classified to global style attribute as part of a combination of features 120 and/or attributes, modeling device 104 may populate such features 120 and/or attributes using the combination, and/or offer a user the option to populate such features 120 and/or attributes using the combination; modeling device 104 may, for instance, automatedly generate furnishings, interior design, decorations, fixtures, wall coverings, floor coverings, doors, windows, and/or ceiling styles automatically, and display views and/or design of interior space to user according to any process described in this disclosure. Such an automatedly generated interior design may be presented to user as an option for interior design, potentially saving the user effort in selecting features 120 for the interior design; user may modify the automatedly selected design to customize a final design according to user's judgement and/or taste.

Still referring to FIG. 1, it should be noted that the above described processes for generating global style attribute are described with respect to global style attribute for exemplary purposes only. Such automatic generation processes may alternatively or additionally be used to generate other global attributes 124 as described in this disclosure.

With continued reference to FIG. 1, modeling device 104 may be configured to generate data structure 112 by generating a first three-dimensional model 136 of a first portion of the interior space based on the current design 108. First three-dimensional model 136 may include or be included in any model suitable for use as a three-dimensional graphical model of current design 108, including without limitation a CAD model. First three-dimensional model 136 may depict to a user such as a designer or other person operating or interacting with system 100 a view of interior space, which may correspond to a view that a user may be able to see in an ordinary field of vision viewing a room from a particular vantage point. View may include, as a non-limiting example, a perspective view. First three-dimensional model 136 may be included in or associated with an interior space data structure 112 containing information concerning interior space that may be used to generate any first three-dimensional model 136, including additional model 164a-b as described below, variables two or more such models have in common, or the like.

Still referring to FIG. 1, generation of first three-dimensional model 136 may include receiving a user selection of a representation of interior space in current design 108; for instance, representation of interior space may be a representation of a corridor, a room, a set of rooms and corridors, or the like. In an embodiment, selection of representation of interior space may include a selection a scope of work to be performed in interior space, and thus selection of portions of a building to be modeled using first three-dimensional model 136. In an embodiment, where reception of current design 108 includes reception of a two-dimensional representation such as one or more blueprints, a first three-dimensional model 136 of interior space may be generated from one or more two-dimensional representations of selected portions of current design 108; this may be performed according to any process describe above for conversion of two-dimensional representations to three-dimensional representations.

Still referring to FIG. 1, generation of first three-dimensional model 136 may include population of first three-dimensional model 136 with one or more features 120 representing a current or starting state of first three-dimensional model 136. One or more features 120 may be inserted by a user, who may, without limitation, drag and drop such features 120 from one or more menus or the like presenting features 120 onto first three-dimensional model 136, select features 120 on such menus and press a button to activate their placement in first three-dimensional model 136, or the like; placement in first three-dimensional model 136 may be further selected and/or refined by user by means of a cursor controlled by a mouse, touch-screen, or similar manual entry device. Selection of features 120 may be performed in conjunction with retrieval and/or display of such features 120 using global style attribute as described above. Alternatively or additionally, current design 108 may be received with one or more geometric or other representations of items in interior space; for instance, where current design 108 is received in BIM form, fixtures, elements of furniture, decorative elements, and the like may already be represented using one or more data structures 112 and/or geometric representations. Where current design 108 includes representations of items in interior space, modeling device 104 may convert such representations into features 120; for instance, features 120 stored in one or more data structures 112 as described above may be matched by geometry to one or more geometric representations, matched by catalog identity or commonly agreed-upon identifiers of features 120, or the like. Matching features 120 may replace representations of items in first three-dimensional model 136 of interior space.

Continuing to refer to FIG. 1, in an embodiment in which methods and/or one or more steps of methods as described in this disclosure are performed iteratively, first three-dimensional model 136 of a portion of interior space may be generated based wholly or in part on a previously generated first three-dimensional model 136 of a portion of interior space; for instance, where the previously generated model represents or provides a view of one end of a corridor or side of a room, currently generated model may represent a second end of the corridor or side of the room. Modeling device 104 may automatedly generate features 120 in current model based on selections made in an earlier view, for instance using global attributes 124 such as global style attribute to populate features 120 that are associated, along with previously selected features 120 and/or attributes, with a combination of features 120 and/or attributes associated with that global style, for instance as described above. As an additional non-limiting example, where a user selected crown molding, floor coverings, wall coverings, or the like, which are capable of extension into other portions of interior space, current view may be populated with those features 120 as well. As a further example, a global style attribute may be applied to current model based on a global style attribute selected, generated, or otherwise derived in a previous iteration of methods and/or one or more method steps as described in this disclosure. One or more additional models 164*a-b* may be subsequently generated in a further iteration of a method as described herein and/or one or more steps thereof.

Still referring to FIG. 1, data structure 112 may include and/or be populated using one or more prefabricated design modules. A prefabricated design module, as used herein, is a collection of features and/or attributes stored in memory of modeling device 104 that are mutually compatible, which may be inserted into data structure 112 and/or used as data structure 112 to permit rapid assembly of an overall design. For instance, for each data structure 112 in an overall project, design decision tree 200, current design 108, and/or other data describing a current project may be matched to one or more prefabricated design modules, which may be used to populate data structure 112 and/or a collection of such data structures, to create a default and/or suggested design. This may be performed automatedly and/or via use selections; user selections of prefabricated design modules may, for instance, be performed by specifying one or more parameters, attributes, features, or the like such as cost, global style or other considerations, which may be used by modeling device 104 to generate an overall design and/or to provide prefabricated design modules for a user to select from to generate overall design. Pre-fabricated models may include interoperable interactive parameters to support the client assembly to "fit" prefabricated models to each other; for instance, rules may be stored in or associated with each pre-fabricated design module indicating one or more such modules that. System may store a value system within the three levels of cost/quality options, such as "good, better, and best." Each prefabricated design module, feature, and/or attribute option, whether automatedly selected and/or presented to and/or selected by user, may include a quality and/or cost designation with such a three or more level system providing a user with a way to compare options and make qualitative and/or budgetary decisions quickly on a per-unit, per-attribute, per-data structure, per-space, and/or per-project basis. A data structure 112, interior design, and/or project created by assembling such prefabricated modules may be modified by user selections and/or automated processes as described in this disclosure. As a non-limiting example, prefabricated modules may be assembled to represent a current design 108 and/or mock plan as described above, and then modified as specified by user entries and/or automated processes. In an embodiment, modifications may cause modeling device to identify alternative prefabricated modules that may match modifications, which may be automatically substituted for existing modules and/or presented to user with tiered quality and/or pricing information, such that user may be presented with an option to follow prefabricated designs with predictable costs and/or to customize according to the user's design vision.

Further referring to FIG. 1, prefabricated design module, data structure 112, and/or three-dimensional models therein may be stored in and/or represented by CAD blocks or other modules built out to form correct spaced plans quickly with costs associated to them for interior finishes and/or other attributes. Prefabricated design modules and/or modules as modified may exist and/or be generated to represent, without limitation, resident room types including studio, semi, 1 bedroom, 2 bedroom, or other types of rooms; circulation, including without limitation corridors, stairs, vestibule, sidewalk, parking, porte cochere, or the like; common areas such as without limitation dining, country kitchen, private dining, spa, salon, fitness, activity such as art and/or games, family/ TV room, resource library, sunroom, front porch, courtyard, telemedicine/VoIP and/or video chat room, lobby, lifeskills, outpatient therapy, community space, or the like; and/or offices such as executive director, closing room, business manager, marketing, activities director, maintenance director, receptionist, food service director, social worker, director of nursing, or the like; back of house spaces such as medication room/charting, laundry, commercial kitchen, receiving, storage, janitors' closets/housekeeping, IT rooms, electrical rooms, and/or mechanical rooms. These examples are not intended to be exhaustive. Persons skilled in the art, upon reviewing the entirety of this disclosure, will be aware of many alternative or additional prefabricated modules and/or modules that may be generated, stored, modified, and/or otherwise used and/or incorporated in embodiments described in this disclosure.

With continued reference to FIG. 1, first three-dimensional model 136 includes a first feature 140 having a first attribute 144 of the plurality of attributes 116. As used herein, inclusion of a feature 120 in a three-dimensional model signifies display of a visible portion of that feature 120 in the three-dimensional model; for instance, where the feature 120 is a fixture, a visible surface of the fixture as seen in a view represented in first three-dimensional model 136, where the feature 120 is a floor covering wall covering, or the like, a portion of the floor or wall that is visible in first three-dimensional view may be displayed in first three-dimensional view, or the like. In general, for a feature 120 that may extend out of first three-dimensional view, such as a feature 120 that runs along a wall, ceiling, or floor far enough for a portion of the feature 120 not to be visible in first three-dimensional view, a portion of the feature 120 that is visible in the first three-dimensional view will display.

Still referring to FIG. 1, generating the first three-dimensional model 136 may include receiving a user selection of first feature 140. User may select first feature 140 in graphical user interface by entering a description of a category and/or type of feature 120 that user wishes to select; modeling device 104 may receive a user entry of a type of feature 120 and query feature database 300 to retrieve one or more features 120 matching user-entered feature 120 type. Alternatively or additionally, one or more features 120 may be automatically displayed to user either in first three-dimensional view and/or in a selection window; user may enter an instruction and/or action selecting a feature 120 of the one or more features 120. As a further non-limiting example, graphical user interface may display a plurality of windows and/or lists of features 120, where each window corresponds to a distinct feature 120 category, permitting user to select a feature 120 from any such window. User selection of first feature 140 may include any user action for modification of first feature 140 as described below. Persons skilled in the art, upon reviewing the entirety of this disclosure, will be aware of various ways in which modeling device 104 may receive a user selection of a first feature 140 and/or provide first feature 140 in first three-dimensional model 136 as a function of a user selection.

In an embodiment, and still referring to FIG. 1, generating the first three-dimensional model 136 may include receiving a photograph of the first portion of the interior space, detecting objects within the photograph, classifying the objects to features 120, and generating the three first three-dimensional model 136 using the features 120. Objects to be classified may include, without limitation, one or more geometric forms present in photograph. One or more geometric forms may be identified using any suitable method for identifying one or more elements of geometry in a digital photograph and/or image, including without limitation edge detection, detection of contrasting colors and/or intensities, or the like. Objects detected may include, without limitation, geometrical forms of a shape of a room, walls, ceiling, floor, fixture, or any other item that may be visible in a photograph of an internal space; such geometric forms may, as a non-limiting example, be projections onto two dimensions of three-dimensional shapes and/or orientations of objects. For instance, a geometric form representing a rectangular section of ceiling, floor, and/or wall may have a substantially trapezoidal form reflecting perspective foreshortening in a photograph.

With continued reference to FIG. 1, modeling device 104 may be configured to classify objects identified in photograph to features 120 using an object classifier 148. Object classifier 148 may include any classifier described above; object classifier 148 may generate an output classifying a geometric form in a photograph to a feature 120 according to any classification algorithm as described above. In an embodiment, modeling device 104 may train object classifier 148 using an object classification training set 152, which may, as a non-limiting example, include geometric forms extracted from photographs and identifications of one or more features 120 associated therewith. Object classifier 148 training set may, for instance, be populated by user entries of photographs of views of interiors with correlated user identifications of features 120, and/or with three-dimensional views generated in previous iterations of methods as described in this disclosure. Modeling device 104 may, in an example, prompt a user to photograph one or more views of interior space that has been constructed according to models and/or data structures 112 as generated in iterations of methods and/or method steps described in this disclosure, identify objects in the form of geometrical figures in the photographs as described above, and create training data entries in object classifier 148 training set with the photographs and correlated features 120; in an embodiment, correlations may be further identified by matching locations of features 120 in a coordinate system used in a three-dimensional view to locations of geometric objects in a photograph, by receiving user identifications or "tags" of particular features 120, or the like.

In an embodiment, and still referring to FIG. 1, object classifier 148 may be used in combination with other processes and/or components described in this disclosure. For instance, and without limitation, user may request a global attribute 124, feature 120, and/or attribute to be used in data structure 112 by photographing another interior space that the user wishes to emulate in some way; objects in a resulting photograph may be classified as before, identifying features 120 in the photograph. Identified features 120 may be displayed to user for potential selection for placement in data structure 112 and/or first three-dimensional model 136. Modeling device 104 may alternatively or additionally identify a global attribute 124 such as without limitation a global style attribute using identified feature 120 or features 120, which may be implemented according to any process as described above, including without limitation querying global attribute database 500, inputting a feature 120 and/or feature 120 combination to a global style classifier 132, or the like.

With continued reference to FIG. 1, a global attribute 124 such as a global style attribute may be selected based on a location-related element of data. For instance, global attribute database 500 may store regional affiliations of global attributes 124, where "regional affiliations" may include elements of data describing geographical locations where a given style is prevalent. Regional affiliations may include, without limitation, regional architectural influences, such as tendencies toward colonial architecture in New England or Spanish influences in Southern California, regional interior design influences, such as a tendency toward Art Deco in New York City. In an embodiment, modeling device 104 may automatically generate a global style attribute based on a user-entered location, which may represent a location of a region whose style a user wishes to emulate; alternatively or additionally, modeling device 104 may determine a location of user and/or interior space based upon a user device's navigational systems such as without limitation Global Positioning System (GPS) and/or a recorded or received physical address and/or geographical location of interior space. As a further non-limiting example, global style attribute may be set by determining and/or receiving an architectural style of an exterior of a building containing interior space and identifying a matching global style attribute. Global style attribute may alternatively or additionally be selected using a global style attribute of another internal space in the same building as internal space; the global style attribute of the other internal space may have been set in a previous iteration of a method or method step as described in this disclosure, by a user identification thereof, by analysis and/or object classification performed on a user photograph of the other internal space, or the like.

Continuing to view FIG. 1, modeling device 104 may be configured to generate one or more additional models 164a-b of interior space, each of which may be generated according to any process suitable for generation of three-dimensional model as described above. In an embodiment, one or more additional models 164a-b of interior space may have matching or identical attributes to three-dimensional model; for instance, each additional model 164a-b may have the same global style attribute as three-dimensional model. In an embodiment, three-dimensional model and additional model 164a-b are all elements of an interior space data structure 112 representing a larger portion of interior space than that represented in any one of three-dimensional model and/or additional model 164a-b; interior space data structure 112 may represent the entirety of interior space. Interior space data structure 112 may have any or all attributes suitable for use as attributes of three-dimensional model, including without limitation global style attribute; in an embodiment, some or all attributes of three-dimensional model may be stored at the interior space data structure 112. Each additional model 164a-b may be generated dynamically; for instance when a user enters a command to rotate or otherwise modify an orientation of a view of interior space, an additional model 164a-b may be generated by modification of three-dimensional model. Interior space data structure 112 may contain data representing any features 120 or portions of features 120 of a model of internal space that is not included in the view provided by three-dimensional model; these may be considered features 120 of three-dimensional model for purposes of methods herein whether they are depicted in three-dimensional model or not.

Still referring to FIG. 1, a second attribute 156 of plurality of attributes 116 may be exterior to the first three-dimensional model 136. In an embodiment, an attribute is "exterior" to first three-dimensional model 136 where, the attribute is not localized to the first 3D model. For instance, and without limitation, the second attribute 156 may be a global attribute 124 such as a style attribute, cost attribute, or the like, which may be associated with first feature 140 in addition to data structure 112 generally. Second attribute 156 may include an attribute of a second feature 160 that is not in first three-dimensional mode. Second attribute 156 may be an attribute common to two features 120. Second attribute 156 may be an infrastructural attribute such as structural support, wiring, plumbing, or the like. Populating plurality of attributes 116 may include generating the second attribute 156 using first attribute 144; for instance, where first attribute 144 includes a given amount of weight on a wall-mounted feature 120, second attribute 156 may include an associated structural attribute requiring a stud or other supporting element to be present in a wall where the wall-mounted feature 120 is located, which modeling device 104 may use to select second attribute 156. Populating the plurality of attributes 116 may include generating the second attribute 156 as a function of first feature 140; for instance, first feature 140 may be associated in feature attribute table 308 with an infrastructural attribute such as a requirement to be connected to an electrical, gas, and/or water supply, which modeling device 104 may use to select second attribute 156. Second attribute 156 may alternatively or additionally be selected by modeling device 104 using a global attribute 124, for instance as described above; second attribute 156 may, for instance, be an attribute of a feature 120 generated as a function of a global attribute 124 such as global style attribute, where the feature 120 in question is "off screen" for first three-dimensional view.

Still referring to FIG. 1, modeling device 104 is configured to display the first three-dimensional model 136 to a user. This may be accomplished according to any suitable method for display of a three-dimensional model on a display of a computing device and/or in a graphical user interface. In an embodiment, event handlers in graphical user interface may enable user to select one or more features 120 displayed with first three-dimensional model 136, where selection may enable user to click and/or tap and drag one or more features 120 from one location to another in first three-dimensional model 136, to view and/or modify a list of attributes of and/or associated with a selected feature 120, or the like. Modeling device 104 may be further configured to receive a user command switching to a second three-dimensional model, which may be generated upon receiving user command; user command may include a user selection of a directional arrow to "pan" view to a different portion of internal space, which may be overlapping with and/or distinct from the portion displayed in first three-dimensional model 136, a user click-and-drag pan to a view of a different portion of internal space, or the like. Any process, method, method step, and/or configuration described in this disclosure regarding first three-dimensional model 136 may alternatively or additionally be applied regarding second three-dimensional model.

Further referring to FIG. 1, display of three-dimensional model 136 and/or any other model to user may be performed using any suitable user interface types as described in this disclosure, including without limitation personal computers, desktop computers, laptops, tablets, mobile devices, and/or web browsers. Display may be performed via a native application such as a mobile application, as a plug-in and/or modification of a CAD program, using a client-side program generated and/or provided by way of a web browser or other client-device program and/or application, or the like.

With continued reference to FIG. 1, modeling device 104 is configured to receive at least a command to modify the first attribute 144. Command may be entered by a user, for instance and without limitation using any manual or other data entry device or component incorporated in or operating with modeling device 104. Command may add one or more features 120 to three-dimensional model, for instance by selection, dragging and dropping or other processes as described above. Command to modify may include a command to remove one or more features 120 from three-dimensional model; for instance, and without limitation, a user may select one or more features 120 using a cursor or the like and drag the one or more features 120 out of the three-dimensional model or select a "delete" or "remove" button or similar command. Another command that may be provided may be a "clear" option which may remove all features 120 except, for instance, those representing walls, structural ceilings and floors, permitting user to repopulate interior space with a novel design. User may enter a command to change global style attribute; this may cause features 120 currently in three-dimensional model to be replaced with default features 120, such as those described above, associated with global style attribute.

Still referring to FIG. 1, receiving the at least command to modify the three-dimensional model may include receiving at least a command including a change to a first feature 140 of the three-dimensional model. For instance, user may enter a command or instruction to change a color, shape, style, material, or other attribute of a first feature 140; command may be entered by selection in one or more drop-down menus or the like of options corresponding to feature 120. For instance, and without limitation, one drop-down menu may offer various colors from which user may select a desired color, while another menu may offer materials, or styles of carving, or other attributes a user may vary to achieve a desired effect. In an embodiment, the at least a command to modify the first feature 140 may include a command to replace first feature 140 with a second feature 160, and the second feature 160 may have an attribute differing from the first attribute 144; in other words, the attribute of the second feature 160 may have an identical attribute type, but a different attribute value.

In an embodiment, and still referring to FIG. 1, receiving at least a command may include receiving at least a user goal, and modifying first feature 140 as a function of the at least a user goal. At least a user goal may include, without limitation, a manufacturing time goal, such as a goal to finish a remodeling and/or construction of, and/or installation of features 120 within, interior space within a certain number of man-hours, by a certain calendar date or the like. At least a user goal may include an energy consumption goal, which may specify that first feature 140 and/or all features 120 in interior space should consume less than a certain amount of electrical energy, gas, or the like. At least a user goal may include a cost goal, specifying a maximal cost user is willing to spend on first feature 140 and/or interior space as a whole. Persons skilled in the art, upon reviewing the entirety of this disclosure, will be aware of various alternative or additional goals that modeling device 104 may receive from a user. Modeling device 104 may be configured to automatically select a first feature 140 to match the at least a user goal. Where at least a user goal is a single goal, such as a maximal cost for first feature 140 and/or internal space as a whole, modeling device 104 may query feature database 300 for a set of features 120 matching the goal; feature database 300 may, for instance, list a cost of each feature 120 as an attribute thereof, which may be compared to a feature 120 cost goal via numerical comparison and/or to an overall cost goal for interior space by aggregating feature 120 cost with costs of features 120 and/or attributes already selected the interior space and comparing the aggregated cost to an overall cost goal, and/or dividing the overall cost goal into a cost per feature 120, and comparing feature 120 to that cost per feature 120 as described above. In an embodiment, user may be provided with a warning or other message indicating where a feature 120 will exceed a cost goal for that feature 120, or selection of the feature 120 may cause an aggregate cost to exceed an overall cost goal; user may be able to modify first feature 140 and/or one or other features 120 or production parameters affecting cost at user discretion. Further examples for processes usable for calculation of costs are provided below.

Alternatively or additionally, and continuing to refer to FIG. 1, modeling device 104 may be configured to select and/or propose a first feature 140 as a function of two or more user-specified goals. This may be accomplished, as a non-limiting example, by assembling a feature 120 goal vector representing a plurality of user-specified goals. A feature 120 goal vector as used herein is a data structure 112 that represents a quantitative measure of a degree of importance a user places on each of a plurality of user goals, including without limitation, cost, production time, quality of materials, longevity of materials, popularity of a feature 120, and/or energy consumption. A feature 120 goal vector, as defined in this disclosure, is n n-tuple of values, where n is at least two values, as described in further detail below. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other, however "vector" as used herein is not necessarily limited to a particular mathematical or geometric definition thereof. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute 1 as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance be advantageous where each vector represents a weighing of user priorities, and/or is to be compared to such a weighing of user priorities. Feature 120 goal vector may include a plurality of goal vector entries, which are attributes of feature 120 goal vector as described above. Each of plurality of goal vector entries may represent any user-specified goal as described above Persons skilled in the art, upon reviewing the entirety of this disclosure, will be aware of various additional attributes that may be used for goals in feature 120 goal vector.

Still referring to FIG. 1, modeling device 104 may derive feature 120 goal vector by receiving at least a user input. For instance, a graphical user interface may display at user device options to rate one or more priorities absolutely and/or relatively to each other, for instance by providing a numerical rating scale with radio buttons and/or drop-down lists, sliders where a user may set relative importance along a continuum for each feature 120 goal vector attribute, and/or textual entry fields wherein a user may enter numbers reflecting user's personal degree of importance for each field. Such selections, whether normalized or not, may be recorded and/or analyzed as weights applicable to one or more attributes of features 120 and/or data structure 112. Features 120 selected in data structure 112 and attributes not associated with features 120 alike may be combined using vector addition, normalization, and the like; as a result, a single feature 120 may be represented as a vector having values corresponding to values in feature 120 goal vector, while a combination of two or more features 120 and/or attributes, including without limitation a combination of all features 120 and/or attributes listed in and/or associated with data structure 112 may be represented as such a vector for purposes of comparison to feature 120 goal vector.

With continued reference to FIG. 1, modeling device 104 may designed and configured to select a vector representing a feature 120, combination of features 120, and/or combination of features 120 with attributes, using a loss function by generating a loss function of the plurality of vectors representing features 120, combinations of features 120, and/or combinations of features 120 with attributes and feature 120 goal vector, minimizing the loss function, and selecting a vector from the plurality of vectors representing features 120, combinations of features 120, and/or combinations of features 120 with attributes as a function of minimizing the loss function; a first feature 140 may be selected from and/or presented using a vector selected via minimizing the loss function, for instance by tracking, in memory of modeling device 104, which features 120 and/or attributes were used to generate vectors input to the loss function. A "loss function", as used herein is an expression of an output of which an optimization algorithm minimizes to generate an optimal result. As a non-limiting example, modeling device 104 may select a feature 120, combination of features 120, and/or combination of features 120 with attributes having an associated vector that minimizes a measure of difference from feature 120 goal vector; measure of difference may include, without limitation, a measure of geometric divergence between vector representing feature 120, combination of features 120, and/or combination of features 120 with attributes and feature 120 goal vector, such as without limitation cosine similarity, or may include any suitable error function measuring any degree of divergence and/or aggregation of degrees of divergence, between attributes of feature 120 goal vector and vector representing feature 120, combination of features 120, and/or combination of features 120 with attributes. Selection of different loss functions may result in identification of different vectors as generating minimal outputs. Alternatively or additionally, each of feature 120 goal vector and each vector representing a feature 120, combination of features 120, and/or combination of features 120 with attributes may be represented by a mathematical expression having the same form as mathematical expression; modeling device 104 may compare the former to the latter using an error function representing average difference between the two mathematical expressions. Error function may, as a non-limiting example, be calculated using the average difference between coefficients corresponding to each variable. An intervention having a mathematical expression minimizing the error function may be selected, as representing an optimal expression of relative importance of variables to a system or user. In an embodiment, error function and loss function calculations may be combined; for instance, a variable resulting in a minimal aggregate expression of error function and loss function, such as a simple addition, arithmetic mean, or the like of the error function with the loss function, may be selected, corresponding to an option that minimizes total variance from optimal variables while simultaneously minimizing a degree of variance from a set of priorities corresponding to variables. Coefficients of mathematical expression and/or loss function may be scaled and/or normalized; this may permit comparison and/or error function calculation to be performed without skewing by varied absolute quantities of numbers. Server may select a plurality of features 120, combinations of features 120, and/or combinations of features 120 with attributes to user; for instance, ranking may be maintained of features 120, combinations of features 120, and/or combinations of features 120 with attributes according to a degree to which they minimize loss function, and a number of highest-ranking features 120, combinations of features 120, and/or combinations of features 120 with attributes, such as the ten highest ranking features 120, combinations of features 120, and/or combinations of features 120 with attributes or the like, may be selected and/or displayed to user.

In an embodiment, and still referring to FIG. 1, modeling device 104 may be configured to present selected features 120, combinations of features 120, and/or combinations of features 120 with attributes and/or features 120, combinations of features 120, and/or combinations of features 120 with attributes to user; for instance, each selected vector, and/or a feature 120 matching a user's initially requested feature 120 type as represented in each selected vector, may be presented. This may, in an embodiment, have the result that the user is able to see an impact on one or more user-specified goals as represented by a feature 120, combination of features 120, and/or combination of features 120 with attributes. Modeling device 104 may additionally select a feature 120, combination of features 120, and/or combination of features 120 with attributes maximizing impact on one particular goal such as without limitation cost, for instance by running loss function against a vector having all elements except that one goal set to zero; this may be displayed as well to inform the user of a maximal possible impact on cost, giving user an additional way to view feature 120 selection. In an embodiment, modeling device 104 may receive user input modifying feature 120 goal vector, for instance as described above; modeling device 104 may repeat above-described processes for selection of one or more features 120, combinations of features 120, and/or combinations of features 120 with attributes, including any cost-function process, and display selected features 120, combinations of features 120, and/or combinations of features 120 with attributes a second time.

With continued reference to FIG. 1, modeling device 104 may filter suggested and/or automatically selected features 120 using one or more filtering criteria. A "filtering" criterion, as used in this disclosure, is a goal that modeling device 104 treats as an absolute requirement; in other words, features 120 and/or attributes that do not meet a filtering criterion may be excluded from any set of suggested and/or selected features 120 and/or attributes. In an embodiment, modeling device 104 may provide a user with an option to identify one or more "required" or mandatory goals, which modeling device 104 may treat as filtering criteria, while other goals may be treated as "goals" as described above, to which loss function or other balancing or optimization approaches may be performed for the purposes of ranking features 120 and/or attributes. As a non-limiting example, a user may set as a filtering criterion a maximum cost per feature 120, a cost for a particular feature 120, and/or an overall cost for the interior space, such that no feature 120 is selected that causes the maximum cost to be exceeded; a number of additional goals, which may be any goals as described above, may be specified by the user and subjected to a loss-function analysis to produce a ranked list of all features 120 fulfilling the filtering criterion. There may be multiple filtering criteria, in which case features 120 may be selected to fulfill all filtering criteria.

Still referring to FIG. 1, a user may be provided with one or more options to select filtering criteria and/or goals; one or more options may be provided, for instance, as checkboxes allowing user to select one or more criteria on the basis of which to include or exclude suppliers and/or features 120, such as union versus non-union labor. One or more options may include means to permit user to select degrees along a continuum of choices, such as a slider allowing using to select between rapid completion time and slower completion time, higher and lower cost, or the like. Options may alternatively or additionally be provided to user in a "good-better-best" format, allowing user to make rapid tradeoff choices between potentially conflicting or otherwise balanced goals and/or filtering criteria, such as cost and quality. As a further non-limiting example, cost calculation may be weighted and/or otherwise calculated differently for different parts of a building; for instance, separate modules for cost calculation for items such as back of house (BOH), common area, resident rooms may be provided to the user. Modules may be further subdivided and/or allocated by further categories such as without limitation categories associated with low voltage items, lighting, kitchen equipment, plumbing, heating, ventilation, and air conditioning (HVAC) items and systems, security items and systems, roof, basement, parking, high technology, and the like. Persons skilled in the art, upon reviewing the entirety of this disclosure, will be aware of various ways in which costs may be categorized, calculated, and/or modified based on user inputs, and of various ways in which such user inputs may be received or collected.

With continued reference to FIG. 1, where user command causes modeling device 104 to return one or more features 120 to match a user goal, for instance according to any methods described above, one or more features 120 in or associated with three-dimensional model and/or interior space data structure 112, and/or one or more suppliers capable of providing and/or installing one or more items represented by features 120, may be filtered according to one or more criteria, including without limitation such as union versus non-union labor, local sourcing, particular materials, preferred suppliers of users, or the like. Calculations of price may be performed on a per-item basis, a per-unit (length, area, volume) basis, or the like; classifications of either design elements, suppliers, or installers may be retrieved from, e.g., a database or data structure 112 storing such information to derive bases for filtering. Persons skilled in the art will be aware, upon reviewing the entirety of this disclosure, that any factor that may affect cost calculation for a feature 120, interior space, attribute, and/or data structure 112 as described in further detail below may be associated with a feature 120 and/or data structure 112 as an additional attribute, and may be subject to a filtering criterion and/or goal.

Still referring to FIG. 1, in an embodiment, modeling device 104 is configured to modify the first three-dimensional model 136 as a function of the at least a command to modify the first attribute 144. As a non-limiting example, where command includes at least a command to including a change to a first feature 140 of the three-dimensional model, modifying may include modifying the three-dimensional model based on the at least a command; for instance, first feature 140 may be modified based on the command by modifying a geometric or other visual representation of first feature 140 based on modifications. One or more attributes may be modified as well, for instance where command specifies a change to one or more attributes. Where a new feature 120 is inserted, visual representation of feature 120 may be modified to match interior space and/or other features 120 thereof; this may include detecting dimensions and/or shape of the interior space, and forming feature 120 based on detection; for instance, where feature 120 represents a recessed ceiling, recess may have a shape based on a shape of a room or corridor containing recess, such as a cross-sectional form proportional to but smaller than a cross-sectional form of the room, or the like. Geometry of visual element of feature 120 may be modified to reflect a perspective view of portion of interior space, or to fit dimensions or shape or room in any of various other ways that may occur to persons skilled in the art upon reviewing the entirety of this disclosure.

In an embodiment, and continuing to refer to FIG. 1, where first feature 140 has at least a first attribute 144, as described for instance above, at least a command may include a command to modify at least a first attribute 144, for instance as noted above. Alternatively or additionally, command may have consequence of modifying at least an attribute of first feature 140; for instance, a user selection overwrite one feature 120 with another, replacing one or more attributes of feature 120 with one or more different attributes. As a further example, changing length, breadth, material of feature 120 may change a weight attribute; changing a color or output intensity of a light fixture may trigger a change in attributes representing electrical properties of the fixture.

In an embodiment, and with continued reference to FIG. 1, modeling device 104 may impose one or more limits on modifications to features 120, which may be based, as a non-limiting example, on practical or budgetary limits to physical modifications that may be made to an interior space corresponding to three-dimensional model. For instance, and without limitation, making architectural changes to structural elements such as load-bearing walls in the interior space may be out of scope; modeling device 104 may determine that at least a command requires a modification to first feature 140 that would violate such a limit, such as by requiring a modification to a load-bearing wall, and may prevent the modification to first feature 140 as a result. As a further example, at least a command may call for a modification to an attribute of first feature 140 that necessitates a modification to an attribute of second feature 160 that violates the limit or requires a modification to second feature 160 itself that violates the limit.

Still referring to FIG. 1, modeling device 104 may be designed and configured to modify second attribute 156 as a function of modification to first attribute 144. For instance, and without limitation, modeling device 104 may determine that a change to first attribute 144 conflicts with second attribute 156; for instance, a mismatch between at least a first attribute 144 and at least a second attribute 156 may be indicative of one or more practical consequences of a modification to first feature 140 that require corresponding modifications to at least a second attribute 156 and/or to second feature 160. Such practical consequences may include, for instance, a heavier or different sized doorframe, as represented by second feature 160 needed for a different door as represented by first feature 140, for instance where first feature 140 is modified to represent a door constructed of heavier material, having a different thickness, having a different location or form of latch, or the like. Practical consequences may include a need to reroute or modify wiring to match electrical consumption needs introduced and/or modified for first feature 140; first feature 140 may, for instance, require wiring to be run through or around second feature 160, require greater current capacity than a circuit containing or connected to second feature 160, or the like. As a further non-limiting example, a style attribute of first feature 140 may correspond to a style attribute that is not consistent with a style attribute second feature 160, which may be a global style attribute as described above and/or a local style attribute; modeling device 104 may, without limitation, modify global style attribute upon determining that modification to first feature 140 is consistent with a differing global style attribute and modify at least a second attribute 156 by replacing it with an attribute having a value consistent with the differing global style attribute.

With continued reference to FIG. 1, modeling device 104 may store in memory, such as in a database table and/or data structure 112 as described above, such as feature database 300, attribute database 400, and/or global attribute database 500, one or more relationships between a first attribute 144 and at least a second attribute 156, and/or one or more relationships between first feature 140 and second feature 160. For instance, and without limitation, first feature 140 may include an attribute indicating items with which item represented by first feature 140 are typically paired. As an illustrative example, a feature 120 representing a molding may have an attribute indicating that it typically, or by default, is paired with a baseboard; attribute or additional attributes may impose rules on a second feature 160 representing a baseboard and on first feature 140, whereby a change to color of one triggers modeling device 104 to make a corresponding change to the color of the other one, for instance to match colors, or a change to a carving style of one may trigger a change to a carving style of the other. Such changes may be performed automatedly, or provided to a user, for instance via a user interface, as an option the user may select or reject causing the change to be made or not made, respectively. Such rules may be alternatively or additionally stored in a separate data structure 112 linking rules to features 120. Rules may be entered by users, extracted or obtained from data describing items represented by feature 120 such as without limitation manufacturer or supplier data, and/or derived by collecting statistical correlations between features 120 in uses of system 100 and/or iterations of method 400 performed by current user, all users, or some subset of users.

Still referring to FIG. 1, change to attribute of first feature 140 may include a change to an effect item such as a lighting attribute represented by first feature 140 has on lighting in internal space; such changes may include, without limitation, changes representing increased or decreased light output from light fixtures, decreased or increased light admitted by windows, addition of shades, frosted glass, or other elements that occlude or reduce light output or transmittance, increases or decreases in reflectiveness of item, increases or decreases in fluorescence or phosphorescence, increases or decreases in opacity or translucence, or the like. At least a second attribute 156 may include a pattern of light and/or shadow cast on visual representation of second feature 160 and may be modified to reflect change; visual representation of second feature 160 may be changed accordingly as well. Alternatively or additionally, light and shadow patterns in three-dimensional model may be tracked and represented as an attribute of three-dimensional model and/or of interior space data structure 112 containing the three-dimensional model.

Continuing refer to FIG. 1, visual representation of second feature 160 may be modified as a function of modification to first feature 140, at least a first attribute 144, at least a second attribute 156, and/or visual representation of first feature 140. Changes to visual representation of second feature 160 may include, without limitation, changes to a display of geometry, shape, size, color, texture, or any other aspect of physical appearance of second feature 160 as represented by the visual representation.

Still referring to FIG. 1, in an embodiment, modifying three-dimensional model nay include determining that command contains a modification to the at least a first attribute 144 and modifying global style attribute based on the modification to the at least a first attribute 144. For example, and without limitation, first attribute 144 may be linked to a different global style attribute than the current global style attribute; current global style attribute may be changed as a result. Modeling device 104 may determine this, without limitation, by retrieving global attributes 124 linked to first feature 140 having modified first attribute 144, and/or by determine whether first feature 140 as modified is classified to a new and/or differing global style attribute by global style classifier 132. A prompt may be provided to user inquiring whether the global style attribute should be changed; user may refuse, leading to no change to global style attribute, or accept, allowing change to global style attribute to proceed. In an embodiment, modeling device 104 may modify at least a second feature 160 based on modification to global style attribute; modification may be performed by modifying one or more attributes of at least a second feature 160, visual representation of at least a second feature 160, or the like. Modification may include populating three-dimensional model with a plurality of features 120 consistent with modified global attribute 124 as described above; features 120 in data structure 112 and/or additional model 164a-b as described above may also be updated. Alternatively or additionally, a style attribute or attribute linked to global style attribute of first feature 140 may be modified to match current global style attribute instead of global style attribute being modified; a user may be provided with one or more prompts allowing user to select modification to feature 120 attribute or attributes, global style attribute, neither, or both.

With continued reference to FIG. 1, and as noted above, modeling device 104 may check any or all modifications as described above against a design decision tree 200, where present, for instance by comparing modifications to selections in one or more nodes of design decision tree 200; design decision tree 200 may be modified as a result. Alternatively or additionally a message may be generated informing a user that modifications will modify one or more nodes of design decision tree 200 and/or one or more previously made selections, and user may have option to accept such modifications and/or override such modifications. In an embodiment, where one or more modified and/or replaced features and/or attributes are modifications to and/ or replacements of features and/or attributes represented by nodes and/or selections in decision tree, modifications and/or replacement of such feature and/or attributes may trigger automatic modification and/or replacement of such nodes and/or selections in design decision tree 200.

Figure 6:
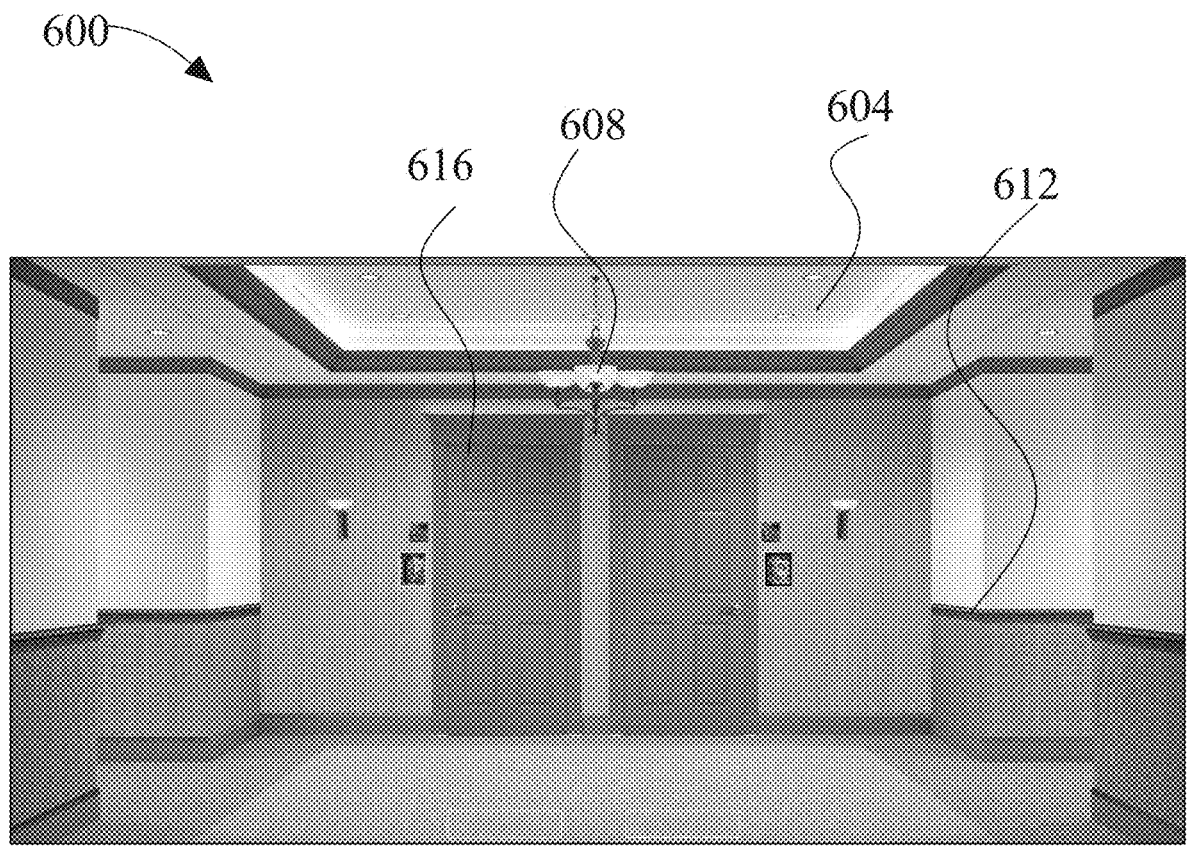
FIG. 6 illustrates screenshot of an exemplary embodiment of a three-dimensional model as described herein.

Referring now to FIG. 6, an exemplary embodiment of a screenshot 600 of three-dimensional model as described in this disclosure is illustrated. One or more visual representations of features 120 as described in this disclosure may include, without limitation, a visual representation of a ceiling 604 a light fixture 608, a chair rail 612, a door 616, or the like. Persons skilled in the art, upon reviewing the entirety of this disclosure, will be able to recognize various additional examples of visual representations of features 120 in screenshot 600. Examples of visual representations of attributes may also be seen, including without limitation a recess of ceiling 604, a chandelier hanging of light fixture 608, and other examples persons skilled in the art may be aware of upon reviewing the entirety of this disclosure. As a non-limiting example of interrelated attributes of features 120, chair rail 612 and door 616 may have complementary but distinct colors, while door may match baseboard color and chair rail may match a color of crown molding. The above-described examples are for illustrative purposes only and are not intended to be limiting.

Still referring to FIG. 6, models, displays, and/or processes may be presented and/or performed in the form of an interactive decision game that pieces together pre-designed modules, optionally with variations real time changing variables and variations, into established floor plans, site plans or into a blank slate environment. Each virtual 3D component, such as three-dimensional mode, 136 and/or features of plurality of features may include financial and/or spatial metadata that may be used to quantify decisions for a rapid and/or seamless process connecting such modules to produce a seamless building plan simulation fly-through and cost analysis. Each decision level, selection, and/or decision in any process described above, including without limitation selections of and/or at nodes in design decision tree 200, may provide three options of good, better and best measured by costs and quality. Methods and systems provided in this disclosure may deliver and/or instantiate a operational module 3-d white box tool that allows a user to modify design options which will impact the design, square footage, cost and/or visual attributes of projects and/or designs. System 100 may present dials, toggles, and/or other controls accepting user modifications to overall space plan and costing; some of these controls may to be set in place at design onset, while others may be toggled on and off during planning. As such controls are adjusted, data structures such as design decision tree 200, data structure 112, features, and/or attributes may be adjusted accordingly, as well as an overall costing and/or space plan. A client proforma and/or other object and/or display element may be auto populated with construction costs, FF&E costs and fees so that a user may review return on investment for various scenarios; such data may be saved along with decision tree instances and/or instances of previous and/or subsequent process iterations, permitting a user to run multiple scenarios and then compare them side by side.

Figure 7:
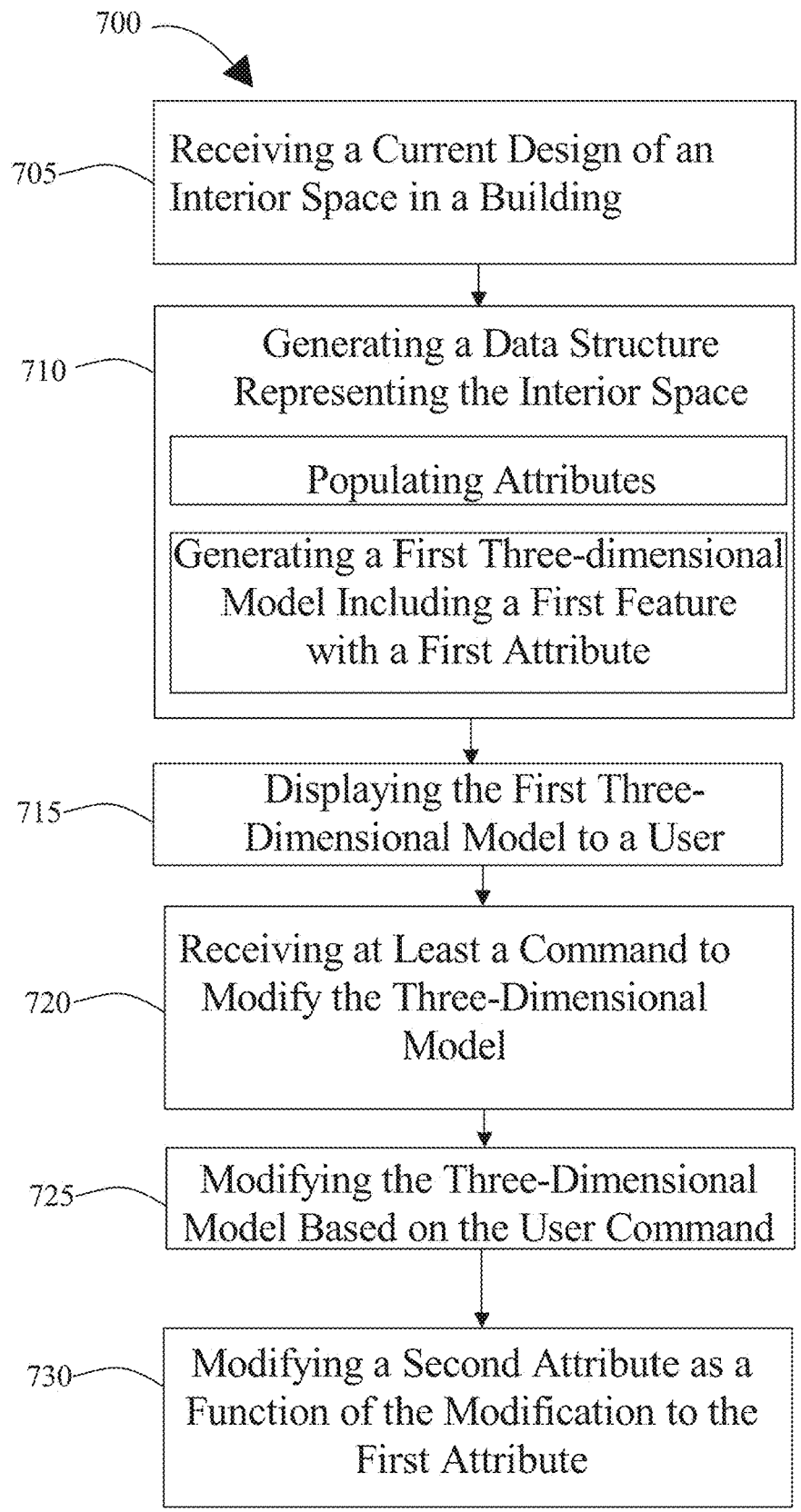
FIG. 7 is a flow diagram illustrating an exemplary embodiment of a method as described herein.

Referring now to FIG. 7, an exemplary embodiment of a method 700 of rendering and modifying three-dimensional models for interior design is illustrated. At step 705, a current design 108 of an interior space in a building is received; this may be accomplished, without limitation, as described above in reference to FIGS. 1-5. At step 710, a data structure 112 representing interior space is generated. Generating the data structure 112 includes populating a plurality of attributes 116 of the data structure 112, for instance as described above in reference to FIGS. 1-5. Generating the data structure 112 includes generating a first three-dimensional model 136 of a first portion of the interior space based on the current design 108; this may be implemented as described above in reference to FIGS. 1-5. Generating first three-dimensional model 136 may include receiving a photograph of the first portion of the interior space, detecting objects within the photograph, classifying the objects to features 120, and generating the three first three-dimensional model 136 using the features 120, for instance as described above in reference to FIGS. 1-5. Generating first three-dimensional model 136 may include determining a global style attribute of the three-dimensional model, associating at least a feature 120 with the current design 108, where the at least a feature 120 further includes at least an attribute matching the global style attribute, and generating the three-dimensional model of the portion of the interior space based on the current design 108; this may be implemented, without limitation, as described above in reference to FIGS. 1-5.

Still referring to FIG. 7, first three-dimensional model 136 includes a first feature 140 having a first attribute 144 of plurality of attributes 116, for instance as described above in reference to FIGS. 1-5. A second attribute 156 of plurality of attributes 116 may be exterior to the first three-dimensional model 136. Second attribute 156 may include a global style attribute. Second attribute 156 may include an infrastructural attribute. Second attribute 156 may include a lighting attribute. In an embodiment, populating plurality of attributes 116 may include generating second attribute 156 using first attribute 144. Populating plurality of attributes 116 may include generating second attribute 156 as a function of first feature 140.

At step 715, modeling device 104 displays first three-dimensional model 136 to a user; this may be implemented as described above in reference to FIGS. 1-5. At step 720, modeling device 104 receives at least a command to modify the first attribute 144; this may be implemented as described above in reference to FIGS. 1-5. For instance, and without limitation, at least a command to modify first feature 140 may include a command to replace first feature 140 with a second feature 160, where the second feature 160 has an attribute differing from first attribute 144. As a further non-limiting example, at least a command may include at least a user goal, and modeling device 104 may automatically select a first feature 140 to match the at least a user goal.

At step 725, and still referring to FIG. 7, modeling device 104 modifies first three-dimensional model 136 as a function of the at least a command to modify the first attribute 144; this may be implemented, without limitation, as described above in reference to FIGS. 1-5. At step 730, modeling device 104 modifies second attribute 156 as a function of modification to first attribute 144; this may be implemented as described above in reference to FIGS. 1-5. For instance, and without limitation, where first feature 140 has at least a first attribute 144 and first three-dimensional model 136 includes a second feature 160 having at least a second attribute 156, modifying the three-dimensional model may include determining that at least a command contains a modification to the at least a first attribute 144 and modifying the at least a second attribute 156 based on the modification to the at least a first attribute 144. As another non-limiting example, where first feature 140 has at least a first attribute 144 and first three-dimensional model 136 further includes a global style attribute, modifying the first three-dimensional model 136 may include determining that at least a command contains a modification to the at least a first attribute 144, and modifying the global style attribute based on the modification to the at least a first attribute 144.

With continued reference to FIG. 7, three-dimensional modeling device 104 may calculate one or more costs of a design project to be undertaken as a function of three-dimensional model and/or interior space data structure 112. This may be done in real time and displayed to the user based on any change the user makes or that is generated automatedly. Calculation of costs may be performed as a function of any suitable combination of factors, including logistical factors, such as shipping prices, distances, or times, provided by one or more suppliers recorded in modeling device 104 as able to provide one or more items represented by features 120, material costs, labor costs, installation costs, and/or installation logistics such as without limitation the need to install electrical wiring or plumbing lines prior to installation of electrical or plumbing fixtures or the like. Calculation of costs may be divided by interior spaces or sections thereof or segregated per trade of persons who may work to modify interior spaces and/or install one or more items based on plans represented in three-dimensional model. Calculation of costs may include calculation of costs based on construction materials. Calculation of costs may include calculation of costs based on professional fees; professional fees may include "artists fees," such as without limitation fees that a designer, architect, or similar professional charges. Calculation of costs may include fees or prices for small wares. Calculation of costs may include fees or prices for fixtures, furniture, and/or equipment (FFE). Any combination of the above-described factors may be used in calculation of costs; for instance, designer fees, FFE, construction materials, and labor (union and/or non-union, for instance as filtered below), may be combined to calculate an overall cost. Cost may be updated in real time as a user makes changes to interior space data structure 112, three-dimensional model, and/or one or more features 120 or attributes; updated costs may be recalculated using any of the above factors and reflecting changes submitted by user and/or automatedly performed by system 100 and may be displayed continuously or upon any change to user.

Still referring to FIG. 7, modeling device 104 may determine, and present to user, information describing costs, logistical constraints, and/or other practical consequences of a design as represented in three-dimensional model. For instance, a given light fixture may be available immediately and/or at low cost, but may require new wiring necessitating an electrician, who may be not be available immediately and/or who may charge more than a difference in cost to a fixture that can be installed with the current wiring. Persons skilled in the art, upon reviewing the entirety of this disclosure, will be aware of various ways in which practical cost and/or logistical consequences of a design as represented in three-dimensional model may be determined and/or presented to a user.

Systems and methods as described herein may provide various advantageous improvements over previously existent functionality. Multifunctionality may a user to see in real time what a space will look like with interior details that may impact a user's construction and/or design budget, life cycle costing, and/or operating budget. Combining design, construction budgeting, 3-D, virtual reality and operating budgets into one seamless package may allow a user to test interior elements, flow and programming spaces with real construction costs and automatic changes to the operating proforma. Systems and methods presented herein may permit a user and/or designer to explore multiple scenarios and/or iterations that would normally be worked out over several projects or at the very least increase the cost of the project and increase delays in finishing. This may allow smarter decisions to be made more quickly and help users to avoid change orders, throughout the project. Costs may also be calculated on module spaces vs. per trade so that adjustments to the overall cost may be made quickly when dropping or increasing square footage.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
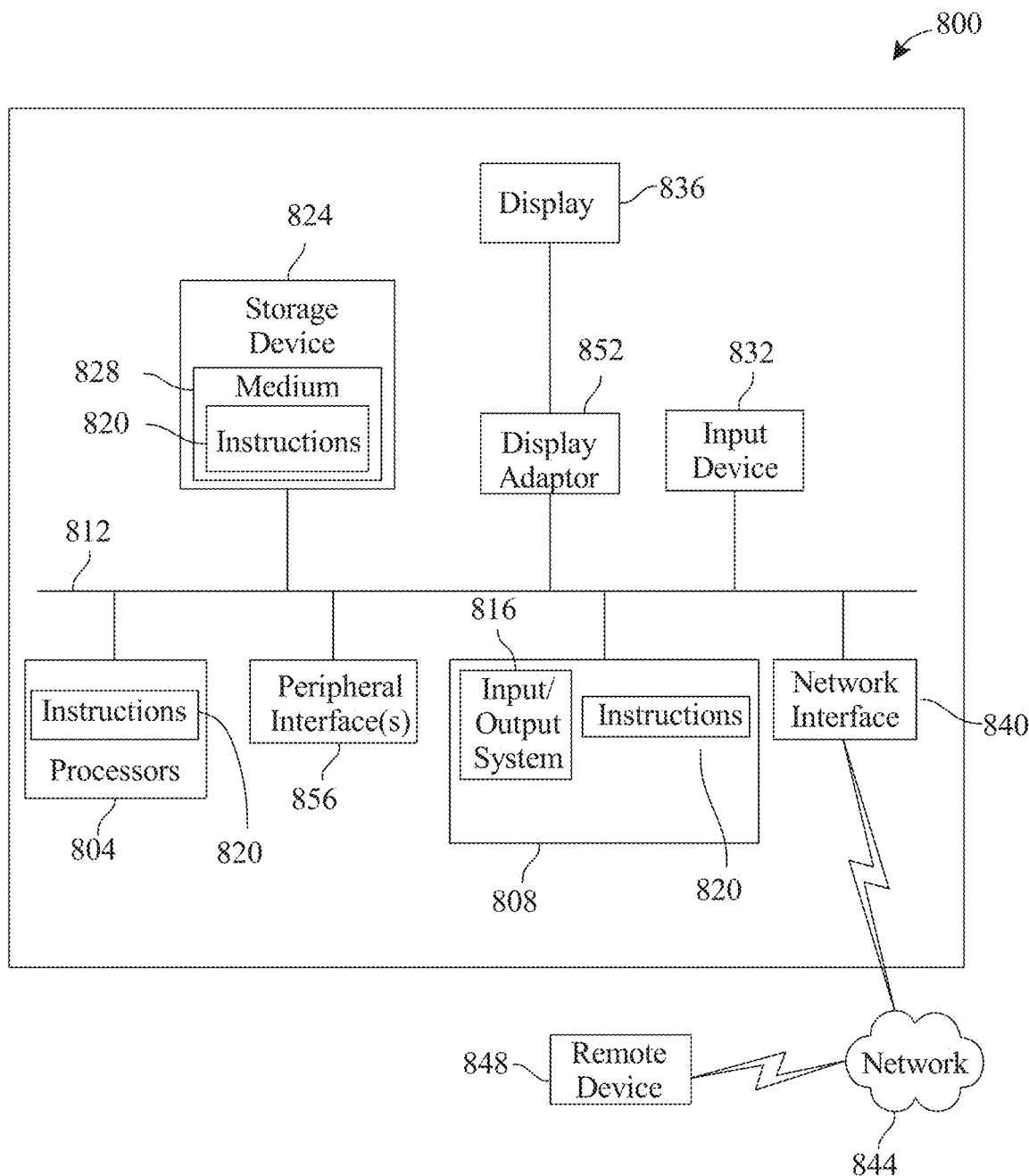
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of rendering and modifying three-dimensional models for interior design, the method comprising:
    receiving a current design of an interior space in a building;
    generating a data structure representing the interior space, wherein generating the data structure further comprises:
        populating a plurality of attributes of the data structure; and
        generating a first three-dimensional model of a first portion of the interior space based on the current design, wherein the first three-dimensional model includes a first feature having a first attribute of the plurality of attributes;
        wherein a second attribute of the plurality of attributes is exterior to the first three-dimensional model and the plurality of attributes incudes a climatic attribute;
    displaying the first three-dimensional model to a user;
    receiving at least a command to modify the first attribute, wherein the at least command comprises a plurality of user goals including an energy consumption goal specifying what level of electrical energy should be consumed by the first feature;
    generating a feature goal vector that represents a quantitative measure of a degree of importance the user places on each of a plurality of user goals as a function of the at least command;
    modifying the first three-dimensional model as a function of the at least a command to modify the first attribute; and
    modifying the second attribute associated with the first feature as a function of the modification to the first attribute.

2. The method of claim 1, wherein the second attribute includes a global style attribute.

3. The method of claim 1, wherein the second attribute includes an infrastructural attribute.

4. The method of claim 1, wherein generating the first three-dimensional model includes receiving a user selection of the first feature.

5. The method of claim 1, wherein generating the first three-dimensional model includes:
    receiving a photograph of the first portion of the interior space;
    detecting objects within the photograph;
    classifying the objects to features; and
    generating the three first three-dimensional model using the features.

6. The method of claim 1, wherein generating the three-dimensional model further comprises
    determining a global style attribute of the first three-dimensional model;
    associating at least a feature with the current design, wherein the at least a feature further includes at least an attribute matching the global style attribute; and
    generating the three-dimensional model of the portion of the interior space based on the current design.

7. The method of claim 1, wherein populating the plurality of attributes further comprises generating the second attribute using the first attribute.

8. The method of claim 1, wherein populating the plurality of attributes further comprises generating the second attribute as a function of the first feature.

9. The method of claim 1, wherein:
    the at least a command to modify the first feature further comprises a command to replace first feature with a second feature; and
    the second feature has an attribute differing from the first attribute.

10. A system for rendering and modifying three-dimensional models for interior design, the system comprising a modeling device, the modeling device designed and configured to receive a current design of an interior space in a building;
    generate a data structure representing the interior space, wherein generating the data structure further comprises:
        populating a plurality of attributes of the data structure; and
        generating a first three-dimensional model of a first portion of the interior space based on the current design, wherein the first three-dimensional model includes a first feature having a first attribute of the plurality of attributes;
        wherein a second attribute of the plurality of attributes is exterior to the first three-dimensional model and the plurality of attributes incudes a climatic attribute;
    display the first three-dimensional model to a user;
    receive at least a command to modify the first attribute, wherein the at least command comprises a plurality of user goals including an energy consumption goal specifying what level of electrical energy should be consumed by the first feature;
    generate a feature goal vector that represents a quantitative measure of a degree of importance the user places on each of a plurality of user goals as a function of the at least command;
    modify the first three-dimensional model as a function of the at least a command to modify the first attribute; and
    modify the second attribute associated with the first feature as a function of the modification to the first attribute.

11. The system of claim 10, wherein the second attribute includes a global style attribute.

12. The system of claim 10, wherein the second attribute includes an infrastructural attribute.

13. The system of claim 10, wherein generating the first three-dimensional model includes receiving a user selection of the first feature.

14. The system of claim 10, wherein generating the first three-dimensional model includes:
    receiving a photograph of the first portion of the interior space;
    detecting objects within the photograph;
    classifying the objects to features; and
    generating the three first three-dimensional model using the features.

15. The system of claim 10, wherein generating the three-dimensional model further comprises
    determining a global style attribute of the first three-dimensional model;
    associating at least a feature with the current design, wherein the at least a feature further includes at least an attribute matching the global style attribute; and
    generating the three-dimensional model of the portion of the interior space based on the current design.

16. The system of claim 10, wherein populating the plurality of attributes further comprises generating the second attribute using the first attribute.

17. The system of claim 10, wherein populating the plurality of attributes further comprises generating the second attribute as a function of the first feature.

18. The system of claim 10, wherein:
   the at least a command to modify the first feature further comprises a command to replace first feature with a second feature; and
   the second feature has an attribute differing from the first attribute.

\* \* \* \* \*